United States Patent

Sawase et al.

[11] Patent Number: 6,001,041
[45] Date of Patent: Dec. 14, 1999

[54] POWER TRANSMISSION

[75] Inventors: Kaoru Sawase; Takahisa Niwa; Yoshihiro Ikushima; Yuichi Ushiroda, all of Tokyo, Japan

[73] Assignee: Mitsubishi Jidosha Kogyo Kabushiki Kaisha, Tokyo, Japan

[21] Appl. No.: 09/029,518

[22] PCT Filed: Jul. 4, 1997

[86] PCT No.: PCT/JP97/02330

§ 371 Date: Mar. 5, 1998

§ 102(e) Date: Mar. 5, 1998

[87] PCT Pub. No.: WO98/01317

PCT Pub. Date: Jan. 15, 1998

[30] Foreign Application Priority Data

| Jul. 5, 1996 | [JP] | Japan | 8-176885 |
| Jul. 15, 1996 | [JP] | Japan | 8-184874 |
| Jan. 31, 1997 | [JP] | Japan | 8-019299 |

[51] Int. Cl.[6] ............................ F16H 37/08
[52] U.S. Cl. ............. 475/198; 475/249; 475/85; 180/248
[58] Field of Search ................ 475/85, 198, 206, 475/249; 477/35; 180/248, 249

[56] References Cited

U.S. PATENT DOCUMENTS

| 4,727,966 | 3/1988 | Hiramatsu et al. | 477/35 |
| 4,819,506 | 4/1989 | Matsumoto | 475/249 X |
| 5,036,940 | 8/1991 | Takemura | 475/231 X |
| 5,320,586 | 6/1994 | Baxter, Jr. | 475/249 |
| 5,697,861 | 12/1997 | Wilson | 475/198 |

FOREIGN PATENT DOCUMENTS

| 61-64029 U | 5/1986 | Japan . |
| 62-25223 U | 2/1987 | Japan . |
| 62205826 | 9/1987 | Japan . |
| 62261538 | 11/1987 | Japan . |
| 62279137 | 12/1987 | Japan . |
| 6387322 | 4/1988 | Japan . |
| 220-413 | 8/1990 | Japan . |
| 333723 U | 4/1991 | Japan . |

*Primary Examiner*—Charles A Marmor
*Assistant Examiner*—Sherry Lynn Estremsky

[57] ABSTRACT

A power transfer apparatus is provided with a rack/pinion type electric shift actuator for changing a traveling mode of a vehicle between high speed mode and low speed mode, and among full-time 4WD mode, 2WD mode, high direct-coupling 4WD mode and low direct-coupling mode. The apparatus further has a hydraulic multiple disc clutch for restricting a differential motion of a center differential gear when the traveling mode is in full-time 4WD mode and the traveling mode is changed over, and a hydraulic pump connected to a counter shaft, for supplying hydraulic pressure to the hydraulic multiple disc clutch.

5 Claims, 17 Drawing Sheets

FOURTH EMBODIMENT

FIFTH EMBODIMENT

SIXTH EMBODIMENT

SEVENTH EMBODIMENT

EIGHTH EMBODIMENT

POWER TRANSMISSION

This application is the national phase under 35 U.S.C. §371 of prior PCT International Application No. PCT/JP 97/02330 which has an International filing date of Jul. 4, 1997 which designated the United States of America, the entire contents of which are hereby incorporated by reference.

BACKGROUND OF THE INVENTION

1. Field of the Invention

The present invention relates to a power transmission apparatus or so-called transfer apparatus for changing over traveling mode of the vehicle between high speed mode and low speed mode or between 2-wheel drive and 4-wheel drive.

2. Background Art

This kind of the transfer apparatus includes a change-over unit for changing over traveling mode of a vehicle and an example of the change-over unit has been disclosed in, for example, Japanese Examined Patent Publication No.Hei8-14309. This known change-over unit includes a single drum member, which is driven by a motor. First and second camgrooves are formed on an outer circumference of the drum member. On the other hand, first and second shift rods are disposed on both sides of the drum member and the first and second shift rods can reciprocate in the axial direction of the drum member. The first and second shift rods have first and second shift forks for changing the driving mode of the transfer unit respectively and pin type cam followers which engage corresponding cam grooves of the drum member.

In the aforementioned change-over unit, as the drum member rotates, by the function of the first and second cam grooves and cam followers or the cam mechanism, the first and second shift rods namely the first and second shift forks are moved, so that the driving mode of the transfer unit is changed over.

The known change-over unit employs the cam mechanism for converting the rotation of the drum member to movement of the first and second shift forks. Thus, it is necessary to form the first and second cam grooves having a complicated configuration on the outer circumference of the drum member. However, working of these cam grooves is very difficult.

Due to the use of the aforementioned cam mechanism, there is no way but disposing the first and second shift rods in parallel to the axis of the drum member, so that an enlargement of the size of the transfer unit is induced.

DISCLOSURE OF THE INVENTION

An object of the present invention is to provide a power transmission apparatus which employs a simple structure, compact change-over unit so that reduction of the overall size thereof can be achieved.

The aforementioned object is achieved by a power transmission apparatus of the present invention. The power transmission apparatus comprises an input shaft for receiving a power from an engine and an intermediate shaft which is a separate member of the input shaft. A rotation of the input shaft is transmitted to the intermediate shaft through an auxiliary transmission means. The auxiliary transmission means includes a counter shaft which is parallel to the input shaft.

The rotation of the intermediate shaft is selectively transmitted to both the front and rear wheels or one of the front and rear wheels by a 2WD–4WD change-over means. The 2WD–4WD change-over means includes a center differential gear.

The power transmission apparatus further comprises a differential limiting means for restricting a differential motion of the center differential gear by use of fluid pressure, and a supply means for supplying the fluid pressure to the differential limiting means. The supply means a fluid pressure pomp which is coaxially connected to a counter shaft and is driven by the counter shaft.

The power transmission apparatus further comprises a shift actuator for operating the auxiliary transmission means and 2WD–4WD change-over means, as the aforementioned change-over unit. The shift actuator includes a first change-over member for operating the auxiliary transmission means, a second change-over member for operating the 2WD–4WD change-over means, the second change-over member disposed coaxially with the first change-over member, and a driving member for moving the first and second change-over members.

In the power transmission apparatus described above, when the first or second change-over members is moved by the driving member, the change-over member make the auxiliary transmission means to carry out a speed change or the 2WD–4WD change-over means to carry out a change-over.

Since the first and second change-over members are coaxially disposed, a compact shift actuator is obtained. As a result, the overall size of the power transmission apparatus has been reduced and with regard to layout of components of the power transmission apparatus, the freedom of the layout is increased.

The fluid pressure pump for supplying fluid pressure to the differential limiting means is connected coaxially with the counter shaft. Therefore, the fluid pressure pump never projects outside the counter shaft in the radial direction thereof. As a result, the reduction of the size of the power transmission apparatus can be achieved.

In a case when the auxiliary transmission means is adapted to increase the rotation speed of the counter shaft relative to the rotation speed of the input shaft, high speed driving of the fluid pressure pump is enabled. Therefore, use of the small size fluid pressure pump is enabled thereby contributing largely to reduction of the size of the power transmission apparatus.

Preferably, the fluid pressure pump is disposed at a position corresponding to the second change-over member relative to the axial direction of the input shaft. In this case, the fluid pressure pump is disposed in a dead space between a front propeller shaft for transmitting a power to the intermediate shaft and front wheels. As a result, the fluid pressure pump never becomes a factor for increasing the size of the power transmission apparatus.

In a case when the 2WD–4WD change-over means includes an endless driving chain for transmitting the rotation to either the front wheels or rear wheels, the fluid pressure pump can be disposed in a space defined by the driving chain. In this case, the dead space within the driving chain can be effectively used as an allocation space for the fluid pressure pump.

Concretely, the auxiliary transmission means includes a transmission sleeve which achieves the speed change by moving in the axial direction of the input shaft and a transmission shift fork for connecting the transmission sleeve to the first change-over member. The 2WD–4WD change-over means includes a change-over sleeve which is disposed coaxially with the transmission sleeve and achieves the change-over by moving in the axial direction of the input shaft and a change-over shift fork for connecting the change-over sleeve to the second change-over member. In this case, the shift actuator comprises first and second racks disposed on the first and second change-over members respectively, a third rack disposed on the driving member, a transmission pinion which meshes with the first and third racks, a change-over pinion which meshes with the second and third racks, and an electric motor for driving the driving member.

In the aforementioned shift actuator, the first-third racks, transmission pinion and change-over pinion compose a rack pinion mechanism. By the rack pinion mechanism, the first or second change-over member, namely the transmission shift fork or the change-over shift fork is selectively operated.

Preferably, the tooth faces of the transmission pinion and change-over pinion have teeth omitting portion in which the teeth lacks. These teeth omitting portions cooperate with first and second stoppers provided on the driving member. More in detail, when the transmission pinion does not mesh with the third rack, the first stopper blocks the rotation of the transmission pinion regardless of the movement of the driving member. When the change-over pinion does not mesh with the third rack, the second stopper blocks the rotation of the change-over pinion regardless of the movement of the driving member. In this case, undesired rotations of the transmission pinion and change-over pinion are prevented, thereby assuring movements of the first and second change-over members.

BEST MODE FOR CARRYING OUT THE INVENTION

Figure 1:
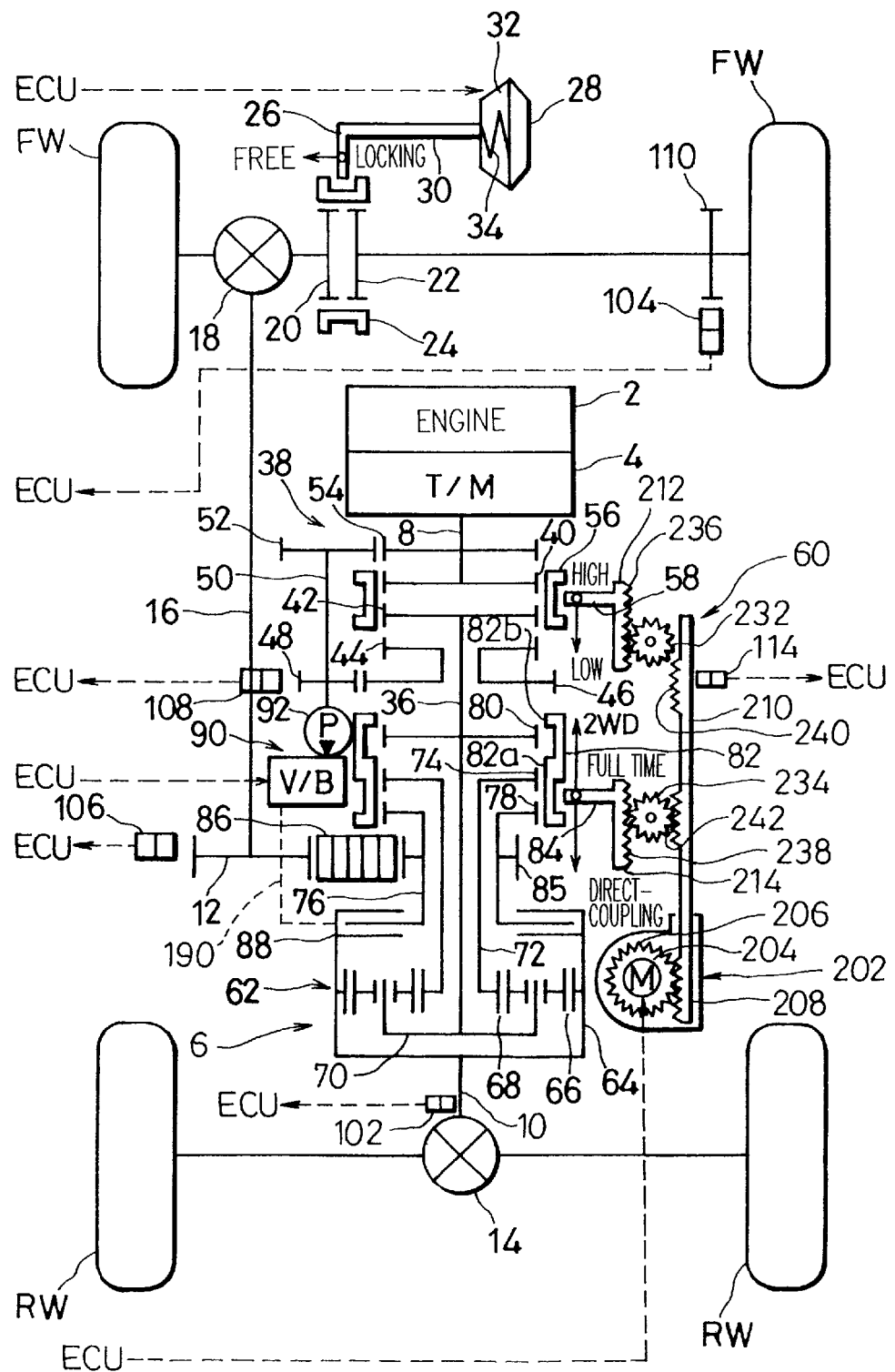
FIG. 1 is a schematic construction diagram of a vehicle including a transfer apparatus for 4WD.

FIG. 1 shows a 4-wheel drive (4WD) vehicle of front engine rear wheel drive (FR) type. The vehicle includes an engine 2, which is connected to a transmission 4. An output shaft of the transmission 4 is connected to an input shaft 8 of a transfer unit 6.

The transfer unit 6 includes a rear output shaft 10 and a front output sprocket 12. A drive power of the input shaft 8 is transmitted to the rear output shaft 10 and the front output sprocket 12. The rear output shaft 10 is connected to a rear differential gear 14 through a rear propeller shaft (not shown). A pair of rear axles extend to the right and left from the rear differential gear 14 and the rear axles are connected to the rear wheels (RW) of the right and left, respectively.

A front propeller shaft 16 extends from the front output sprocket 12 and is connected to a front differential gear 18. A pair of front axles extend from the front differential gear 18 and are connected to the front wheels FW of the right and left, respectively. A detail of the transfer unit 6 will be described later.

As shown in FIG. 1, the right front axle is divided to an axle portion extending from the front differential gear 18 and an axle portion connected to the right front wheel FW and these axle portions have ends which are adjacent to each other. At the ends of the axle portions are attached clutch gears 20 and 22. When a state shown in FIG. 1, the clutch gears 20 and 22 are connected to each other through a coupling sleeve 24. More specifically, the coupling sleeve 24 has an inner gear on its inner circumference, such that the inner gear meshes with the clutch gears 20 and 24. In this case, the two axle portions of the right front axle are rotatable such that they are integral with each other.

The coupling sleeve 24 is slidably supported on a supporting member (not shown) arranged at the vehicle body's side so that it can slide along the right front axle. The coupling sleeve 24 has an annular groove on its outer circumferential surface. A distal end of a shift fork 26 is engaged with the annular groove. The shift fork 26 is connected to an output rod 30 of a vacuum actuator 28.

The vacuum actuator 28 has a housing, in which a diaphragm is disposed. The diaphragm divides an interior of the housing to a negative pressure chamber 32 and an atmospheric chamber. The output rod 30 is projected into the negative pressure chamber 32 and connected to the diaphragm. Atmospheric pressure or negative pressure is selectively supplied to the negative pressure chamber 32. More specifically, the negative pressure chamber 32 is connected to the atmosphere or an intake air system of the engine 2 through an electromagnetic change-over valve (not shown). The negative pressure chamber 32 houses a return spring 34. When pressure in the negative pressure chamber 32 is atmospheric pressure, the return spring 34 urges the diaphragm or the output rod 30 rightward as viewed in FIG. 1, so that the coupling sleeve 24 is moved to a normal locking position. When the coupling sleeve 24 is located at the locking position, the coupling sleeve 24 couples the clutch gears 20, 24 with each other. When negative pressure is supplied to the negative pressure chamber 32, this negative pressure pushes the diaphragm or the output rod 30 against the urging force of the return spring 34 leftward as viewed in FIG. 1. Therefore, the coupling sleeve 24 is moved from the locking position to a free position so that the coupling between the clutch gears 20 and 22 is released. Consequently, the right front wheel FW is separated from the front differential gear 18.

TRANSFER APPARATUS OF A FIRST EMBODIMENT

The aforementioned transfer unit 6 will be described in detail below.

The transfer unit 6 further comprises an intermediate shaft 36. The intermediate shaft 36 is disposed on the same axis as the input shaft 8 and is rotatable independently of the input shaft 8. The input shaft 8 and intermediate shaft 36 have end opposing each other and they are rotatably supported by bearings (not shown), respectively. The bearings are mounted on the side of transfer case of the transfer unit 6.

An auxiliary transmission mechanism 38 is disposed between the input shaft 8 and intermediate shaft 36. The auxiliary transmission mechanism 38 comprises a pair of clutch gears 40 and 42. The clutch gears 40 and 42 are attached to the ends of the input shaft 8 and intermediate shaft 36, which oppose each other, such that the clutch gears 40 and 42 are rotatable integrally with the input shaft 8 and intermediate shaft 36. The intermediate shaft 36 further comprises a clutch gear 44. The clutch gear 44 is rotatably mounted on the intermediate shaft 36. The clutch gear 44 has a low gear 46 which is located on the same axis as the clutch gear 44 and is formed integrally with the clutch gear 44.

The low gear 46 meshes with a counter gear 48 mounted on an end of the counter shaft 50. The counter shaft 50 is disposed in parallel to the intermediate shaft 36 such that the counter shaft50 extends toward the input shaft 8. The counter shaft 50 is rotatably supported on the transfer case through bearings. A gear 52 is provided on the other end of the counter shaft 50. The gear 52 is connected to the input shaft 8 through a gear 54. Therefore, a rotation of the input shaft 8 is transmitted to the low gear 46 through the gears 52 and 54, the counter shaft 50 and the counter gear 48. The number of teeth of the gear 52 is smaller than that of the gear 54 and the number of teeth of the low gear 46 is larger than that of the counter gear 48. Therefore, when the input shaft 8 is rotated, the counter shaft 50 is rotated at a faster speed than the input shaft 8, and on the contrary, the low gear 46 is rotated at a slower speed than the counter shaft 50.

A coupling sleeve 56 is disposed outside the clutch gears 40, 42 and 44. The coupling sleeve 56 has an inner gear like the coupling sleeve 24 described before and is supported movably along the input shaft 8 and intermediate shaft 36. When the coupling sleeve 56 is located at a position shown in FIG. 1 (high gear position), the inner gear of the coupling sleeve 56 meshes with both the clutch gears 40 and 42 so that the coupling sleeve 56 connects the clutch gears 40 and 42 with each other. In this case, the input shaft 8 is connected to the intermediate shaft 36 through the clutch gears 40 and 42, so that the rotation of the input shaft 8 is directly transmitted to the intermediate shaft 36. The rotation of the input shaft 8 is transmitted to the counter shaft 50 through the gears 52 and 54 and further transmitted from the counter shaft 50 to the low gear 46 or the clutch gear 44 through the counter gear 48. Since the clutch gear 44 is rotatably supported on the intermediate shaft 36, the power transmission path from the counter shaft 50 to the intermediate shaft 36 is interrupted at this time.

On the contrary, when the coupling sleeve 56 is moved from the high gear position to a low gear position which is located at the side of the clutch gear 44 as viewed in FIG. 1, the coupling sleeve 56 releases coupling between the clutch gears 40 and 42. Then, the inner gear of the coupling sleeve 56 meshes with the clutch gears 42 and 44 so that the clutch gears 42 and 44 are connected with each other. Therefore, the rotation of the input shaft 8 is transmitted from the counter shaft 50 to the intermediate shaft 36 through the counter gear 48, the low gear 46, the clutch gear 44, the coupling sleeve 56 and the clutch gear 42. In this case, the rotation speed of the intermediate shaft 36 is lower than the rotation speed of a case when the rotation of the input shaft 8 is directly transmitted to the intermediate shaft 36.

A shift fork 58 is engaged with the coupling sleeve 56. The shift fork 58 is reciprocated by an electric driven type shift actuator 60. The shift actuator 60 will be described later.

The coupling sleeve 56 has two functions of achieving a first intermittent coupling between the clutch gears 40 and 42 and a second intermittent coupling between the clutch gears 42 and 44. However, the coupling sleeve 56 may be divided to coupling sleeves for achieving the first intermittent coupling and the second intermittent coupling, respectively.

The intermediate shaft 36 is connected to the rear output shaft 10 through a planetary gear type center differential gear 62. More specifically, the center differential gear 62 has a casing 64 enclosing the other end portion of the intermediate shaft 36. The rear output shaft 10 is projected from the casing 64 axially with the intermediate shaft 36. The casing 64 has a ring gear on its inner circumferential surface. In the casing 64, a sun gear 68 is disposed coaxially with the intermediate shaft 36. The sun gear 68 meshes with the ring gear of the casing 64 through a plurality of the planetary gears 66. These planetary gears 66 are rotatably supported by a carrier 70 attached to the other end of the intermediate shaft 36. The sun gear 68 is attached to one end of the inner sleeve shaft 72. The inner sleeve shaft 72 is rotatably supported on the intermediate shaft 36. The center differential gear 62 receives rotation input or drive power from the intermediate shaft 36 and then transmit the drive power to the inner sleeve shaft 72 and casing 64, respectively. Here, the inner sleeve 72 is a member for outputting a drive power to the front wheels FW and the casing 64 is a member for outputting the drive power to the rear wheels RW. In this case, by a gear ratio of the center differential gear 62, 30% of the drive power is transmitted to the front wheels FW and 70% thereof is transmitted to the rear wheels RW.

The inner sleeve shaft 72 is projected from the casing 64 and extends toward the input shaft 8. A clutch gear 74 is mounted on the other end of the inner sleeve shaft 72. An outer sleeve shaft 76 is rotatably supported on the inner sleeve shaft 72. The outer sleeve 76 extends from the casing 64 toward the clutch gear 74. A clutch gear 78 is mounted on the outer sleeve shaft 76 and is disposed adjacent to the clutch gear 74. A clutch gear 80 is further mounted on the intermediate shaft 36 and is disposed on a side opposite to the clutch gear 78 relative to the clutch gear 74.

A coupling sleeve 82 is disposed outside the clutch gears 74, 78 and 80. The coupling sleeve 82 is supported movably along the intermediate shaft 36. The coupling sleeve 82 has an annular groove on its inner circumferential surface and the annular groove divides the inner gear of the coupling sleeve 82 to two inner gears 82a and 82b.

When the coupling sleeve 82 is located at full-time 4WD position as shown in FIG. 1, the inner gear 82a of the coupling sleeve 82 meshes with the clutch gears 74 and 78 so that the clutch gears 74 and 78 are connected to each other. At this time, the clutch gear 80 is located within the annular groove of the coupling sleeve 82 such that engagement between the clutch gear 80 and coupling sleeve 82 is released. When the coupling sleeve 82 is moved from the full-time 4WD position to 2WD position located on the side of the clutch gear 80, an inner gear 82a of the coupling sleeve 82 meshes with the clutch gears 74 and 80. In this case, the clutch gears 74 and 80 are connected to each other, so that the coupling between the clutch gears 74 and 78 is released. Further, when the coupling sleeve 82 is moved from the full-time 4WD position to direct coupling 4WD position opposite to the 2WD position, the inner gear 82a of the coupling sleeve 82 maintains engagement with both the clutch gears 74 and 78 and the inner gear 82b meshes with the clutch gear 80. Namely, the coupling sleeve 82 connects all the clutch gears 74, 78 and 80 to each other. The coupling sleeve 82 is reciprocated by a shift fork 84. The shift fork 84 is driven by a shift actuator 60 which will be described later.

A sprocket 85 is mounted on the outer sleeve shaft 76 described above and a driving chain 86 extends between the sprocket 85 and the front output sprocket 12 and around them.

A hydraulic multiple disc clutch 88 is disposed between the outer sleeve shaft 76 and the casing 64 of the center differential gear 62. The hydraulic multiple disc clutch 88 is hydraulically connected to a electromagnetically-driven type valve body 90 which houses a hydraulic pump 92. A pump shaft of the hydraulic pump 92 is connected to the counter shaft 50 so that the hydraulic pump 92 is driven by a rotation force of the counter shaft 50 thereby generating a hydraulic pressure. Thus, the hydraulic multiple disc clutch 88 is capable of receiving a supply of hydraulic pressure or clutch pressure from the valve body 90. Depending on a magnitude of clutch pressure supplied, the hydraulic multiple disc clutch 80 is capable of making or breaking a connection between the outer sleeve shaft 76 and the casing 64. Further, a magnitude of torque transmitted from the casing 64 to the outer sleeve shaft 76 can be changed by the hydraulic multiple disc clutch 80. A detail of the valve body 90 will be described later.

The valve body 90, the electromagnetic change-over valve of the vacuum actuator 28 and the shift actuator 60 are electrically connected to an electronic control unit (ECU) 94. The ECU 94 controls the operations of the valve body 90, electromagnetic change-over valve and the shift actuator 60. For this control, various sensors, switches, indicators and the like are electrically connected to the ECU 94.

Figure 2:
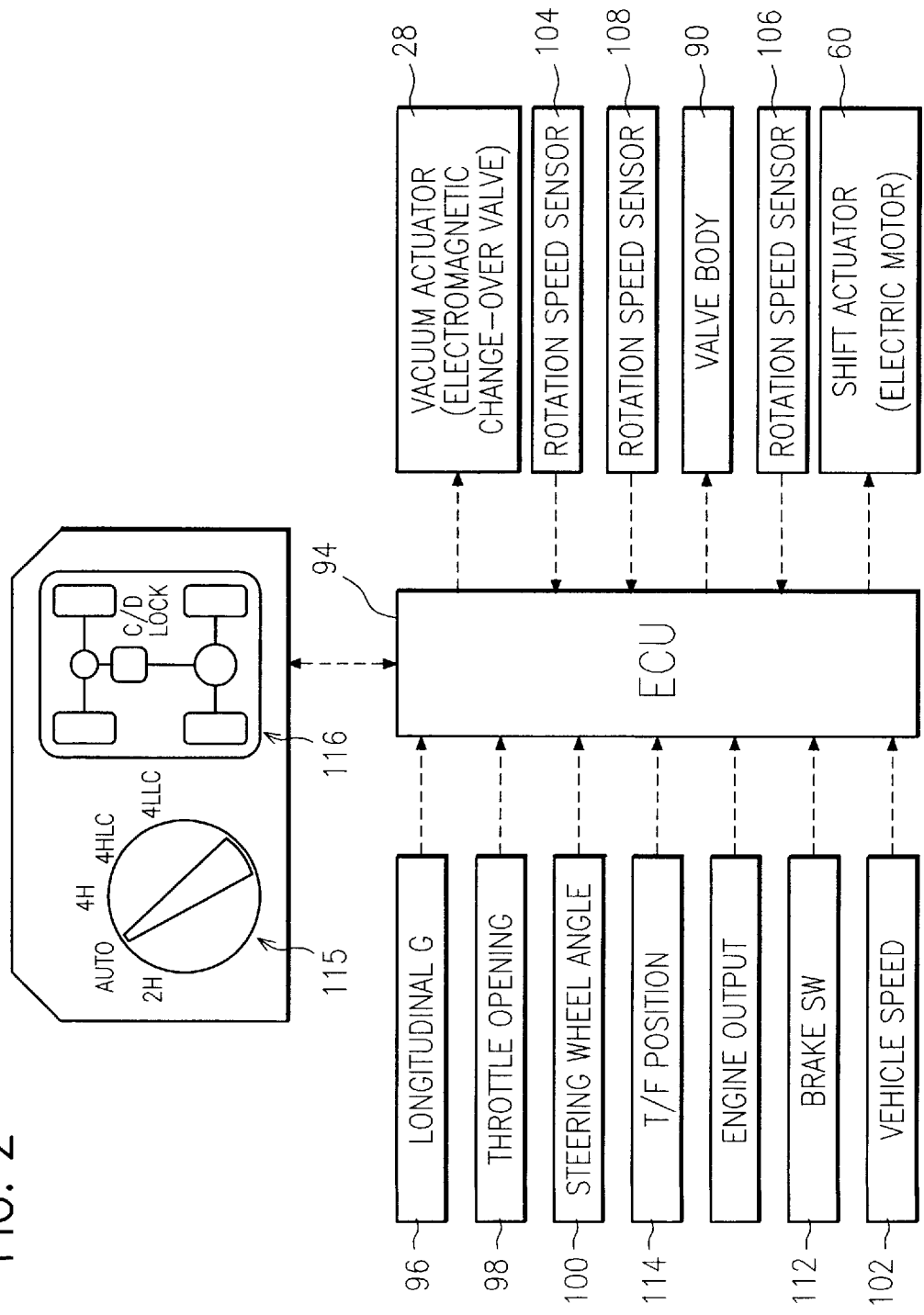
FIG. 2 is a block diagram showing a control system of the transfer apparatus of FIG. 1.

More specifically, as shown in FIG. 2, the sensors connected to the ECU 94 include a sensor 96 for detecting longitudinal acceleration (longitudinal G) applied to the vehicle body in forward and backward directions of thereof, a sensor 98 for detecting an opening of a throttle valve of the engine 2, a sensor 100 for detecting a steering angle of a steering wheel, a sensor 102 for detecting a vehicle speed, rotation speed sensors 104, 106, 108 and the like. The rotation speed sensor 104 detects a rotation speed of a gear 110 or a rotation speed of the right front wheel FW. The gear 110 is mounted on the right front axle in the vicinity of the right front wheel FW. The rotation speed sensor 106 detects a rotation speed of the front output sprocket 12 or a rotation speed of front output of the transfer unit 6. The rotation speed sensor 108 detects a rotation speed of the counter gear 48 or a rotation speed of input in the transfer unit 6. The switches connected to the ECU 94 include a brake switch 112 for detecting an operation of the brake pedal, a transfer position switch 114 for detecting an operation of the shift actuator 60, a mode selection switch 115 and the like. The transfer position switch 114 will be described in detail later together with the shift actuator 60.

The mode selection switch 115 is a manual rotary switch and disposed on an instrumental panel in a vehicle compartment. The mode selection switch 115 has four selection positions which include 2H position indicating 2WD mode, AUTO position indicating auto mode, 4HLc position indicating high direct coupling 4WD mode and 4LLc position indicating low direct coupling 4WD mode. The mode selection switch 115 outputs a signal corresponding to a selected selection position to the ECU 94.

As shown in FIG. 2, the instrumental panel incorporates a 4WD indicator 116. The 4WD indicator 116 is disposed near the mode selection switch 115. The 4WD indicator 116 indicates a selection position selected by the mode selection switch 115 or a driving mode of the transfer unit 6. When the mode selection switch 115 is turned to AUTO position, the 4WD indicator 116 indicates a driving mode currently selected by automatically change over.

The ECU 94 is capable of obtaining output torque information of the engine 2. The output torque information can be calculated in the ECU 94 based on the rotation speed of the engine 2, opening of the throttle, fuel supply amount and the like.

VEHICLE SPEED SENSOR

Hereinafter, the aforementioned vehicle speed sensor 102 will be described in detail.

Figure 3:
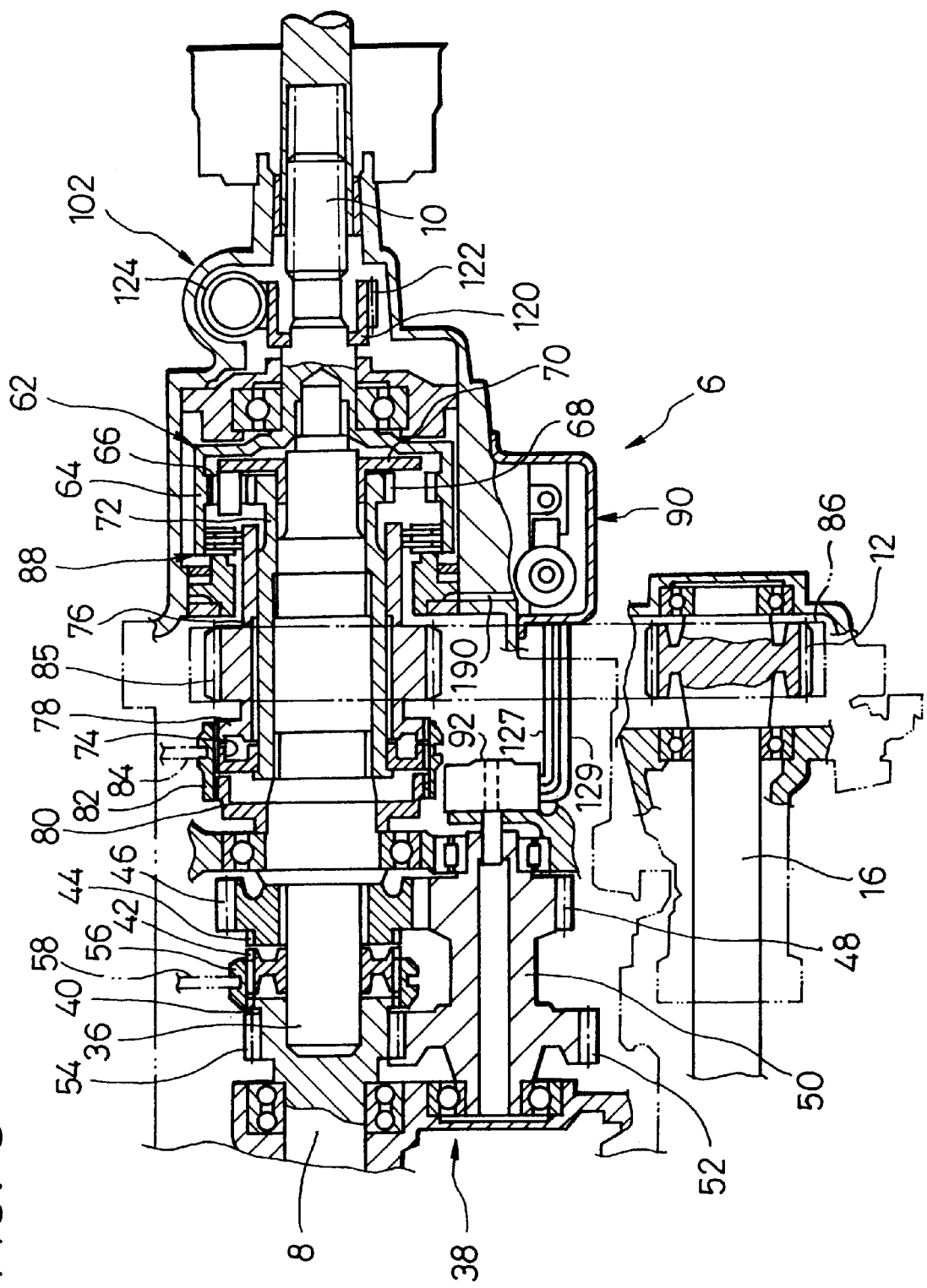
FIG. 3 is a sectional view of the transfer apparatus of FIG. 1.

As shown in FIG. 3, the rear output shaft 10 is inserted into an end portion of the rear propeller shaft or a sleeve yoke 118. More specifically, the sleeve yoke 118 is jointed on the rear output shaft 10 through a spline engagement and supported by a housing of the transfer unit 6 through a sliding bearing. Due to acceleration or deceleration of the vehicle, the sleeve yoke 118 slides on the rear output shaft 10. This sliding permits a movement of the rear axle in an axial direction of the vehicle.

A ring member 120 is disposed the outside of the rear output shaft 10 coaxially therewith. The ring member 120 is located on a side of the center differential gear 62 with respect to the spline portion of the rear output shaft 10. An inside circumference of the ring member 120 is fixed to the rear output shaft 10. Thus, the ring member 120 is rotated integrally with the rear output shaft 10. There is an annular space secured between the ring member 120 and the rear output shaft 10. This annular space permits advancement of the sleeve yoke 118 when the sleeve yoke 118 is moved toward the ring member 120 on the rear output shaft 10.

A screw gear 122 is formed on an outer circumferential surface of the ring member 120. The screw gear 122 meshes with a screw gear 124 as an input shaft of the vehicle speed sensor 102. The vehicle speed sensor 102 includes a multipolar ring magnet mounted coaxially with the screw gear 124. Therefore, the multipolar ring magnet is rotated integrally with the screw gear 124. The vehicle speed sensor 102 further comprises a magnetic resistance element. The magnetic resistance element detects a rotation of the multiplolar ring magnet and outputs a pulse signal proportional to the rotation speed of the rear output shaft 10 to the ECU 94.

According to the vehicle speed sensor 102 described above, the screw gear 122 for driving the vehicle speed sensor 102 is formed on the ring member 120. Thus, the vehicle speed sensor 102 can be disposed within a range in which the sleeve yoke 118 slides on the rear output shaft 10. Consequently, the length of the rear output shaft 10 or the overall length of the transfer unit 6 is reduced.

FIG. 3 shows the concrete structure of the transfer unit 6. The structure of the transfer unit 6 can be understood easily from FIG. 3.

VALVE BODY

The aforementioned valve body 90 will be described in detail with reference to FIGS. 4–6.

The hydraulic pump 92 of the valve body 90 is an internal gear pump. The pump shaft of the hydraulic pump 92 is connected to the counter shaft 50 as described above so that the pump shaft is driven by the counter shaft 50. Therefore, the pump shaft is rotated in normal direction or reverse direction according to the rotation direction of the counter shaft 50, that is, depending on forward traveling or backward traveling of the vehicle. In this embodiment, upon forward traveling of the vehicle, the hydraulic pump 92 is driven in normal direction, and upon backward traveling of the vehicle, the hydraulic pump 92 is driven in reverse direction.

The driving direction of the hydraulic pump 92 is changed as described above, and therefore the hydraulic pump 92 has a pair of ports 126 and 128. Upon forward traveling of the vehicle, one port 126 acts as an outlet and the other port 128 acts as an intake. Conversely, upon backward traveling of the vehicle, the port 126 acts as an intake and the port 128 acts as an outlet.

Both the ports 126 and 128 are connected to a pump control valve 130. The pump control valve 130 is a spool valve having five ports and three positions. More specifically, among ports of the pump control valve 130, two ports 132 and 134 are connected to the ports 126 and 128 of the hydraulic pump 92 respectively. The ports 132 and 134 are separated in the axial direction of the pump control valve 130 or the valve spool 131 thereof. The other three ports are two supply ports 136 and 138, and one exit port 140. The supply ports 136 and 138 are located nearer both ends of the pump control valve 130 than the ports 132 and 134, respectively, and the exit port 140 is located in the center between the ports 132 and 134. The pair of the supply ports 136 and 138 are connected to corresponding branch paths 142 and these branch paths 142 are branched from a single supply path 144. The supply path 144 is connected to a pressure liquid reservoir. A filter 146 is interposed in the supply path 144.

The valve spool 131 of the pump control valve 130 has three lands 148, 150 and 152. A pair of return springs 153 and 155 is disposed on both end sides of the valve spool 131. These return springs 153 and 155 urge the valve spool 131 in opposite direction to each other. When the hydraulic pump 92 is not driven, the valve spool 131 receives urging forces from the pair of the return springs 153 and 155, so that the valve spool 131 is located at a neutral position shown in FIG. 4. At the neutral position, the lands 148, 150 and 152 of the valve spool 131 block the pair of the supply ports 136 and 138, and the exit port 140 while the pair of the ports 132 and 134 is opened. At this time, an annular chamber 154 between the lands 148 and 150 communicates with a spring chamber 158 through an internal path in the valve spool 131. Likewise, an annular chamber 156 between the lands 148 and 152 communicates with a spring chamber 160 through an internal path in the valve spool 131. The spring chambers 158 and 160 are defined at both end sides of the valve spool 131.

When the hydraulic pump 92 is driven in normal direction, the port 128 acts as an intake and the port 126 acts as an outlet as described above. Therefore, the hydraulic pump 92 sucks pressure liquid in the annular chamber 156 and the spring chamber 160 of the pump control valve 130 through the port 128. After this pressure liquid is pressurized by the hydraulic pump 92 and then discharged from the port 126. The discharged pressure liquid is supplied to the annular chamber 154 and the spring chamber 158 of the pump control valve 130. Therefore, a difference in pressure between the spring chambers 158 and 160, namely a difference in pressure applied to both ends of the valve spool 131 is caused. The differential pressure moves the valve spool 131 located at the neutral position leftward against the urging force of the return spring 155, so that the valve spool 131 is located at a first selection position as shown in FIG. 5.

At the first selection position, the lands 148 and 152 of the valve spool 131 opens the exit port 140 and the supply port 136. At this time, the supply port 138 is blocked by the land 150 of the valve spool 131. Additionally, the ports 132 and 134 are also kept open. In this case, the supply port 136 communicates with the port 134 through the annular chamber 156 and the port 132 communicates with the exit port 140 through the annular chamber 156. Therefore, the hydraulic pump 92 sucks pressure liquid from the pressure liquid reservoir through the pump control valve 130, so that pressurized pressure liquid is continuously discharged through the exit port 140 of the pump control valve 130. The discharging amount of the hydraulic pump 92 increases as the rotation speed of the counter shaft 50 increases.

Figure 6:
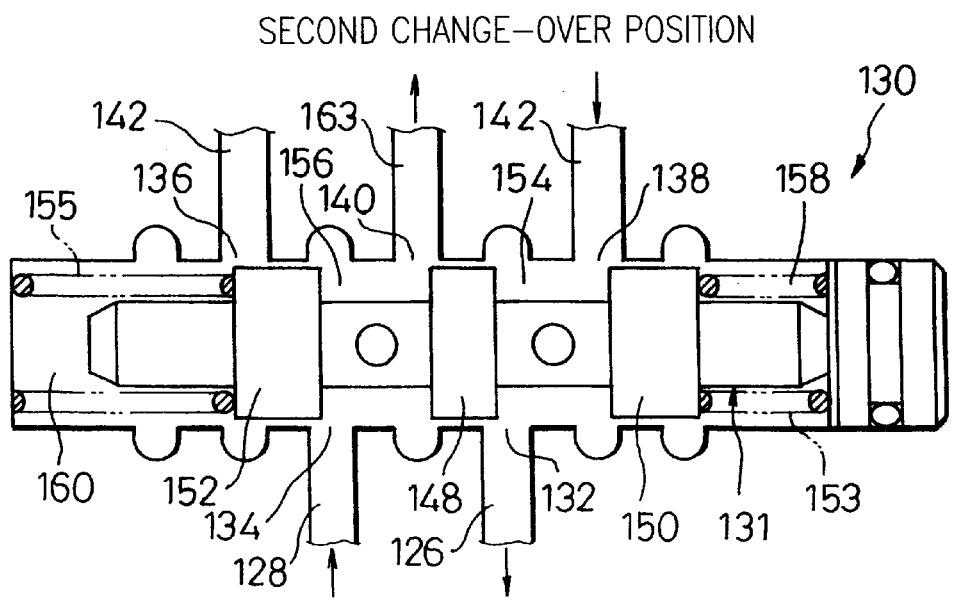
FIG. 6 is a diagram showing a second change-over position of the valve spool of FIG. 5.

When the hydraulic pump 92 is rotated in reverse direction, the valve spool 131 of the pump control valve 130 moves rightward from the neutral position against the urging force of the return spring 153 and is located at a second selection position shown in FIG. 6. At the second selection position, the supply port 138 communicates with the port 132 through the annular chamber 154 and the exit port 140 communicates with the port 134 through the annular chamber 156. In this case also, the hydraulic pump 92 sucks pressure liquid from the pressure liquid reservoir through the control valve 130 and a pressurized pressure liquid is continuously discharged from the exit port 140 of the pump control valve 130.

Figure 4:
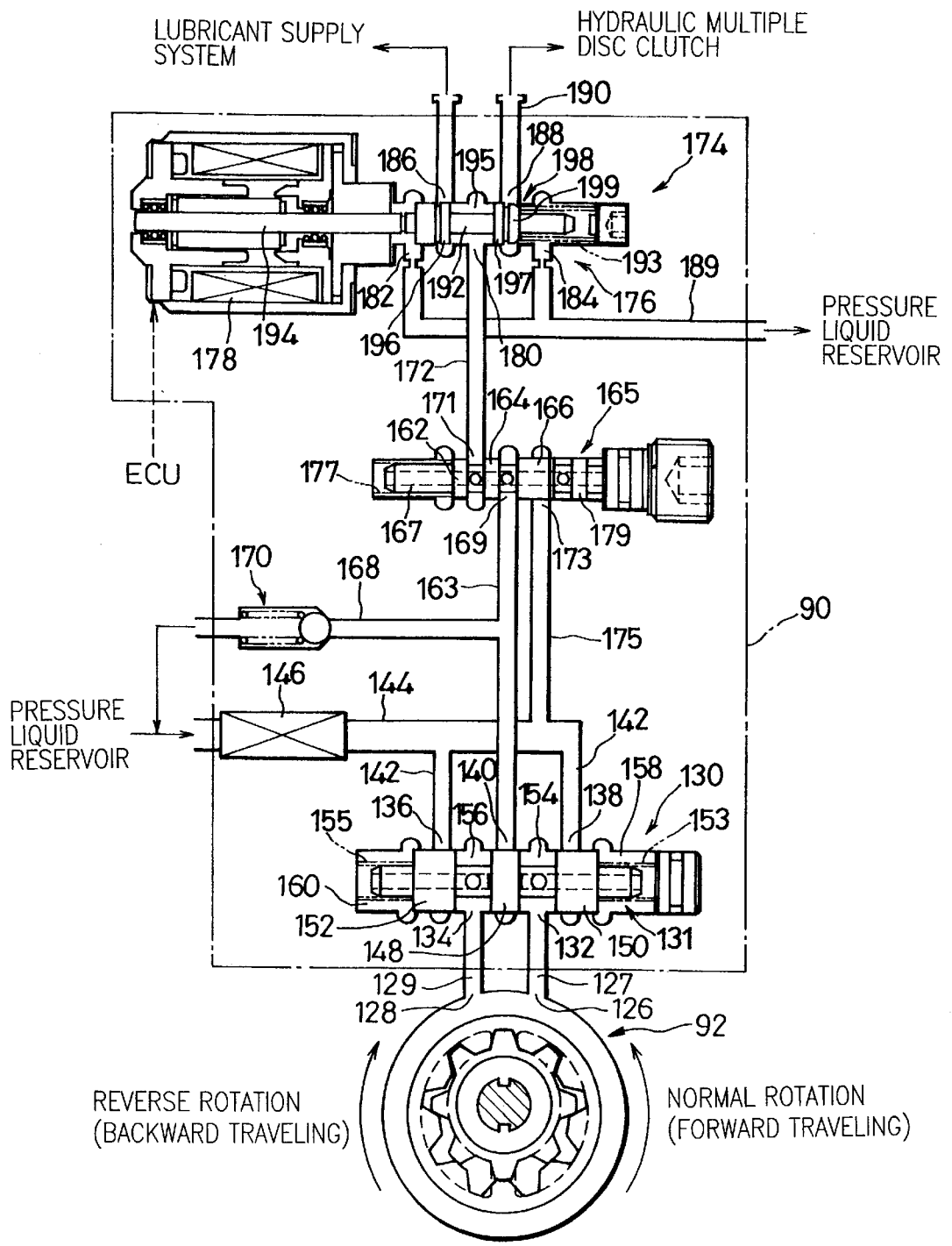
FIG. 4 is a hydraulic circuit in a valve body for supplying a pressurized liquid to a hydraulic multiple disc clutch.
Figure 5:
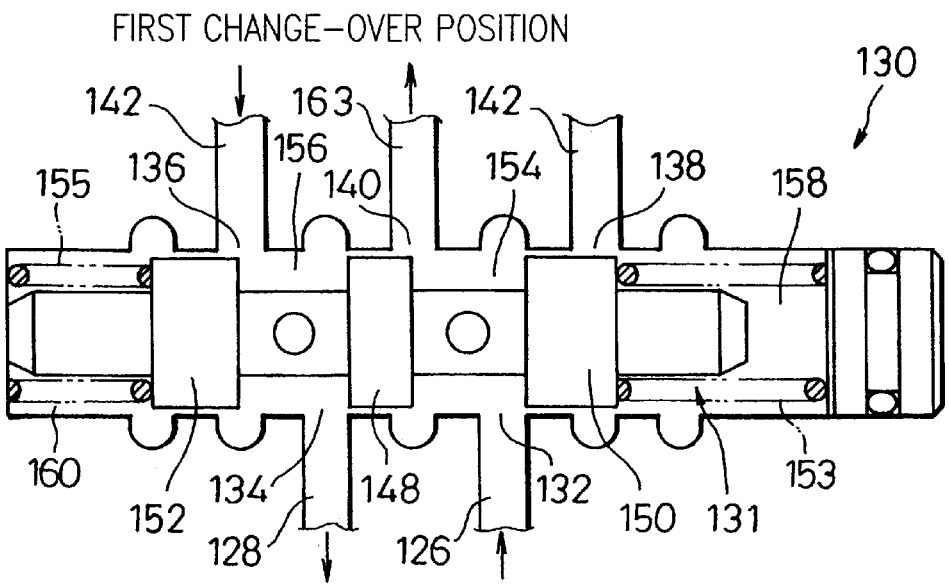
FIG. 5 is a diagram showing a first change-over position of a valve spool in a control valve.

As shown in FIG. 4, a discharging path 163 extends from the exit port 140 of the pump control valve 130 and is connected to a flow control valve 165. The flow control valve 165 is also a spool valve, which has a valve spool 167. The flow control valve 165 further has an intake port 169, an exit port 171 and a return port 173. The exit port 171 and return port 173 are disposed on both sides of the intake port 169 as viewed in the axial direction of the valve spool 167. The intake port 169 is connected to the discharging path 163 and the return port 173 is connected to the supply path 144 through a return path 175.

A return spring 177 is disposed at a left end side of the valve spool 167 as viewed in FIG. 4 and urges the valve spool 167 rightward. Therefore, the valve spool 167 receives an urging force of the return spring 177 so that the valve spool 167 is located at its rest position. The valve spool 167 has four lands 162, 164, 166 and 179. When the valve spool 167 is located at the rest position, the lands 162 and 164 are disposed on both sides of the exit port 171. The intake port 169 is disposed between the lands 164 and 166, such that the land 166 blocks the return port 173. The land 179 is disposed on the right side of the return port 173.

An internal path is formed in the valve spool 167. The internal path extends axially in the valve spool 167 such that the internal path opens at both ends of the valve spool 167. The internal path communicates with annular chambers formed between the respective lands of the valve spool 167. A pressure receiving area on the left side of the land 162 as viewed in FIG. 4 is smaller than that of the other lands 164, 166 and 179.

When pressure liquid is supplied to the flow control valve 165 from the pump control valve 130 through the discharging path 163, this pressure liquid is introduced to the exit port 171 through the internal path of the valve spool 167 from the intake port 169, and then is discharged from the exit port 171.

As the discharging amount from the hydraulic pump 92 increases, the internal path of the valve spool 167 restricts a flow amount of pressure liquid from the exit port 171 as compared to the amount of pressure liquid flowing into the intake port 169. Therefore, as compared to a pressure of the intake port 169, the pressure at the exit port 171 drops. Since the pressure receiving area on the left side of the land 162 is smaller than that on the right side of the land 164, the valve spool 167 is moved leftward from the rest position shown in FIG. 4 against the urging force of the return spring 177. As a result, the return port 173 is opened by the land 166 of the valve spool 167 and a part of pressure liquid flowing into the intake port 171 is made to escape to the return port 173 through the internal path of the valve spool 167 and the annular chamber between the lands 166 and 179. Consequently, the discharging amount of pressure liquid from the exit port 171 is adjusted.

A relief path 168 is branched from the discharging path 163 and is connected to the supply path 144 in the downstream of the filter 146. A relief valve 170 that is a check valve is inserted in the relief path 168. The relief valve 170 is opened only when the pressure in the discharging path 163 exceeds a predetermined relief pressure.

A connecting path 172 extends from the exit port 171 of the flow control valve 165 and is connected to an electromagnetic operating type pressure control valve 174. The pressure control valve 174 includes a spool valve 176 and an electromagnetic solenoid 178 for driving the spool valve 176. The spool valve 176 has a valve spool 192 and five ports 180, 182, 184, 186 and 188. The connecting path 172 is connected to the intake port 180. A pair of return ports 182 and 184 is disposed on both sides of the intake port 180 in the axial direction of the valve spool 192. The exit port 186 is disposed between the intake port 180 and the return port 184 and the exit port 188 is disposed between the intake port 180 and the return port 184. The pair of return ports 182 and 184 is connected to a return path 189 through each branch path. The return path 189 is connected to the side of the pressure liquid reservoir. The exit port 186 is connected to a lubricant supply system in the transfer unit 6. A clutch path 190 extends from the exit port 188 and is connected to the hydraulic multiple disc clutch 88 (see FIG. 1).

Referring to FIG. 4, a return spring 193 is disposed on the right end side of the valve spool 192 and urges the valve spool 192 leftward. The valve spool 192 receives the urging force of the return spring 193 so that the valve spool 192 is located at the rest position. At this rest position, a left end of the valve spool 192 is in contact with an actuator rod 194 of the electromagnetic solenoid 178.

The valve spool 192 has two lands 196 and 198. When the valve spool 192 is located at the rest position, the intake port 180 is located between the lands 196 and 198 and at this time, the land 196 opens the exit port 186. Therefore, the intake port 180 communicates with the exit port 186 through an annular chamber 195 between the lands 196 and 198. The land 198 is of stepped shape and has a large-diameter land portion 197 on the side of the intake port 180 and a small-diameter land portion 199 on the side of the return spring 193. The large-diameter land portion 197 interrupts communication between the exit port 188 and annular chamber 195 and the small-diameter land portion 199 makes the exit port 188 communicate with the return port 184 when the valve spool 192 is located at the rest position. Therefore, pressure liquid in the hydraulic multiple disc clutch 88 is made to escape to the pressure liquid reservoir on a low pressure side, so that an interlocking in the hydraulic multiple disc clutch 88 is released.

The electromagnetic solenoid 178 is electrically connected to the ECU (see FIG. 2) described before and supplied electricity by receiving a control signal from the ECU 94. When the electromagnetic solenoid 178 is powered, the actuator rod 194 is pushed out toward the valve spool 192, so that the valve spool 192 is displaced rightward as viewed in FIG. 4 from the rest position against the urging force of the return spring 193. Due to the displacement of the valve spool 192, the land 196 blocks the exit port 186 and the small-diameter land portion 199 of the land 198 interrupts a communication between the exit port 188 and the return port 184. After that, the large-diameter land portion 197 of the land 198 opens the other exit port 188 so as to make the intake port 180 communicate with the exit port 188 through the annular chamber 195. Therefore, pressure liquid supplied to the intake port 180 of the pressure control valve 174 is delivered from the exit port 188 through the annular chamber 195. The delivered pressure liquid is supplied to the hydraulic multiple disc clutch 88 through the clutch path 190. Consequently, the pressure in the hydraulic multiple disc clutch 88 or the clutch pressure is raised.

The land 198 has a difference in pressure receiving area between the large-diameter land portion 197 and the small-diameter land portion 199. Therefore, when the clutch pressure of the hydraulic multiple disc clutch 88 exceeds a predetermined pressure, the valve spool 192 moves toward the rest position while pushing backs the actuator rod 194 of the electromagnetic solenoid 178 according to the difference in the pressure receiving area of the land 198. Due to the movement of the valve spool 192, the large-diameter land portion 197 blocks the exit port 188 and the land opens the exit port 186. As a result, the clutch pressure in the hydraulic multiple disc clutch 88 is maintained. In this case, pressure liquid supplied to the intake port 180 is supplied to the lubricant supply system through the annular chamber 195 and exit port 186.

As evident from the above description, the clutch pressure in the hydraulic multiple disc clutch 88 is determined by a force of the actuator rod 194 of the electromagnetic solenoid 178 for pushing the valve spool 192. Thus, the ECU 94 is capable of adjusting the clutch pressure of the hydraulic multiple disc clutch 88 by controlling the power fed to the electromagnetic solenoid 178. As a result, the hydraulic multiple disc clutch 88 is capable of changing its torque transmission force arbitrarily. This means that an allocation of drive power transmitted from the center differential gear 62 to the front wheels FW and rear wheels RW can be changed arbitrarily.

The aforementioned hydraulic pump 92, pump control valve 130, flow control valve 165, pressure control valve 174 and respective paths are all incorporated in the valve body 90. Therefore, the circuit from the hydraulic pump 92 to the pressure control valve 174 is formed as one unit and this unit formation largely contributes to reduction of the size of the valve body 90.

Since the hydraulic pump 92 is driven by the counter shaft 50, as the vehicle speed increases, the rotation speed of the hydraulic pump 92 also increases. Therefore, the hydraulic pump 92 of a small capacity can be used, thereby contributing to reduction of the size of the valve body 90.

Further, as evident from FIG. 3, the valve body 90 is disposed between the intermediate shaft 36 and the front propeller shaft 16 and extends along the intermediate shaft 36. More specifically, the hydraulic pump 92 of the valve body 90 is disposed in dead space between the coupling sleeve 82 surrounding the intermediate shaft 36 and the front propeller shaft 16. Therefore, the hydraulic pump 92 is not protruded out of the transfer case of the transfer unit 6, so that a compact transfer unit 6 can be obtained. As a result, an excellent mounting capacity of the transfer unit 6 on the vehicle is assured.

Further, as viewed in the axial direction of the intermediate shaft 36, the hydraulic pump 92 and the hydraulic multiple disc clutch 88 are disposed at different positions. Therefore, by securing a large diameter of the hydraulic multiple disc clutch 88, the thickness of the clutch 88 or the length of the clutch 88 along the axial direction of the intermediate shaft 36 can be reduced.

The hydraulic pump 92 can be disposed between the sprocket 85 of the outer sleeve shaft 76 and the front output sprocket 12. More specifically, the hydraulic pump 92 is disposed in dead space surrounded by the driving chain 86 between the sprocket 85 and the front output sprocket 12. In this case, use of the hydraulic pump 92 of a large capacity is enabled without inducing enlargement of the transfer unit 6.

The hydraulic pump 92 is directly connected to the counter shaft 50. Even if the allocation of drive power transmitted from the center differential gear 62 to the front wheels FW and rear wheels RW is therefore changed by the action of the hydraulic multiple disc clutch 88, that change does not affect the rotation speed of the hydraulic pump 92. Thus, the hydraulic pump 92 is capable of always supplying a stabilized hydraulic pressure to the hydraulic multiple disc clutch 88.

As described above, the rotation speed of the counter shaft 50 is higher than the rotation speed of the intermediate shaft 36. Therefore, if the hydraulic pump 92 is driven by not the intermediate shaft 36 but the counter shaft 50, the hydraulic pump 92 is capable of generating a sufficiently high hydraulic pressure so that the clutch pressure can be supplied to the hydraulic multiple disc clutch 88 at a good response.

Since the hydraulic pump 92 is disposed in the vicinity of the hydraulic multiple disc clutch 88, the hydraulic pressure circuit from the hydraulic pump 92 to the hydraulic multiple disc clutch 88 can be formed in compact structure.

SHIFT ACTUATOR

The aforementioned shift actuator 60 will be described in detail with reference to FIG. 7.

The shift actuator 60 comprises a motor unit 202. The motor unit 202 has a unit case (not shown) and an electric motor 204 housed in the unit case. The electric motor 204 is capable of rotating both in normal and reverse directions. The electric motor 204 is electrically connected to the ECU 94 so that the driving and rotation direction are controlled by the ECU 94. The electric motor 204 has an output shaft. A pinion 206 is mounted on the output shaft. The pinion 206 engages with a driving rack 208 that is slidably supported by the unit case of the motor unit 202.

More specifically, the driving rack 208 is projected from the unit case in the axial direction of the transfer unit 6. At the projection end of the driving rack 208 is connected a main shift rail 210 through a dog joint. Thus, the main shift rail 210 and driving rack 208 are disposed on the same axis. The main shift rail 210 integrally extends from the driving rack 208. A pair of sub-shift rails 212 and 214 is disposed in the vicinity of the main shift rail 210 and extends in parallel to the main shift rail 210. The sub-shift rails 212 and 214 are located on the same axis and a predetermined space is secured between the sub-shift rails 212 and 214.

Here, the sub-shift rail 214 is disposed at a position corresponding to the aforementioned hydraulic pump 92 as viewed in the axial direction of the input shaft 2, namely the intermediate shaft 36 (see FIG. 1).

Figure 7:
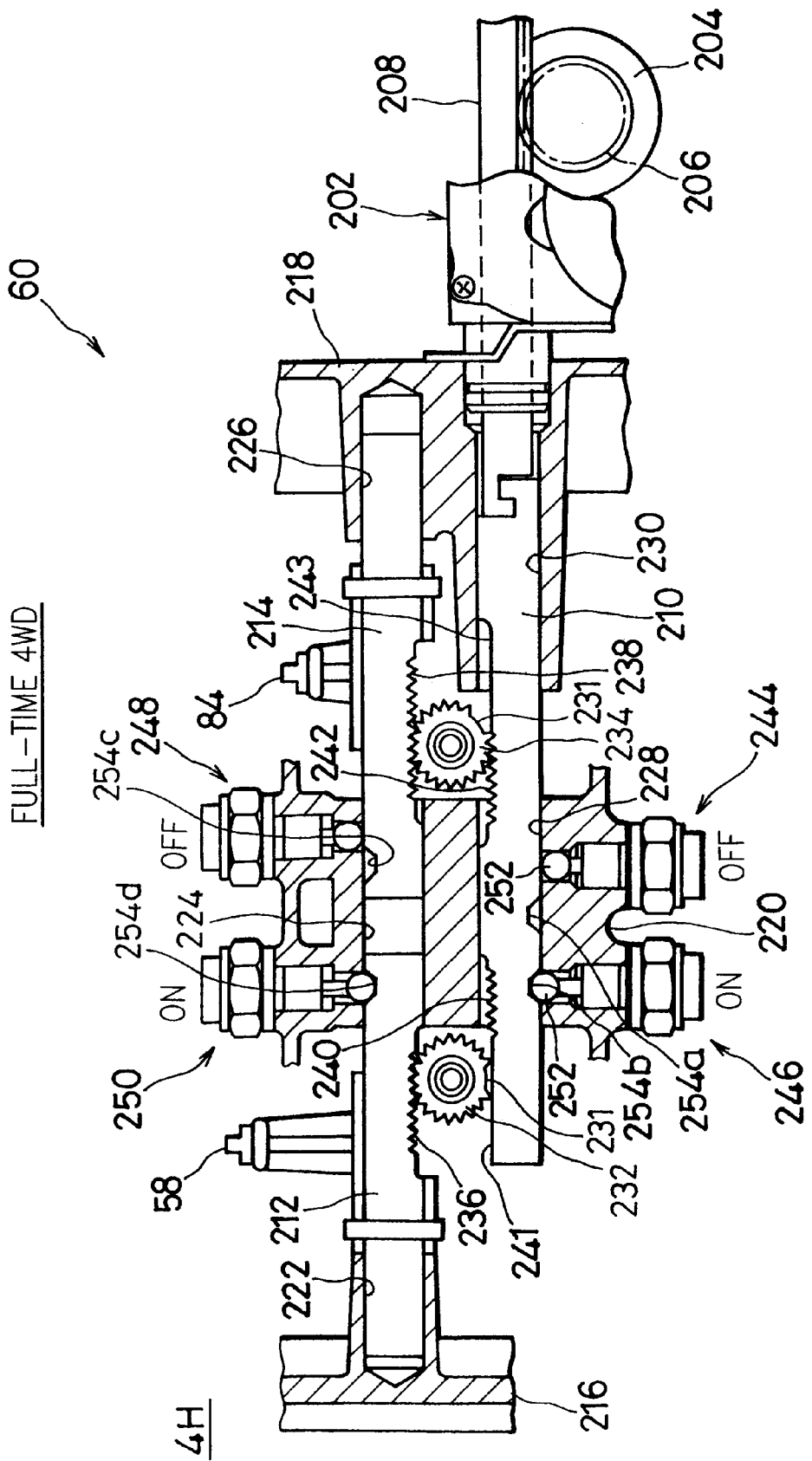
FIG. 7 is a longitudinally sectional view of a shift actuator in which full-time 4WD mode is a base mode.

As viewed in FIG. 7, the left sub-shift rail 212 has the shift fork 58 of the transfer unit 6 and the right sub-shift rail 214 has the shift fork 84 of the transfer unit 6. The main shift rail 210 and the sub-shift rails 212 and 214 are supported slidably on rail guides in the transfer unit 6. These rail guides include a front rail guide 216, a rear rail guide 218 and a center rail guide 220. The front and rear rail guides 216 and 218 are disposed with a distance in the axial direction of the transfer unit 6 and the center rail guide 220 is disposed between the front and center rail guides 216 and 218. These rail guides are supported by the transfer case of the transfer unit 6 or fixing members disposed in the transfer case.

The front rail guide 216 has a guide hole 222. An end portion of the sub-shift rail 212 is slidably fitted in the guide hole 222. The center rail guide 220 and rear rail guide 218 have a through hole 224 and a guide hole 226, respectively. The through hole 224 and guide hole 226 are disposed on the same axis as the guide hole 222. The other end of the sub-shift rail 212 is slidably fitted in one end of the through hole 224 of the center guide rail 220. An end of the sub-shift rail 214 is slidably fitted in the other end of the through hole 224. The other end of the sub-shift rail 214 is slidably fitted in the guide hole 226 of the rear rail guide 218.

The center rail guide 220 and rear rail guide 218 further have a through hole 228 and a guide hole 230 respectively. The through hole 228 and guide hole 230 are disposed on the same axis and are parallel to the through hole 224 and the guide hole 226. The main shift rail 210 is slidably fitted in the through hole 228 of the center rail guide 220 and projected from both the sides of the through hole 228. The main shift rail 210 and driving rack 208 are connected to each other in the through hole 230 of the rear rail guide 218. The main shift rail 210 and driving rack 208 are slidably supported in the through hole 230.

A pair of pinions 232 and 234 are disposed on both sides of the center rail guide 220. These pinions 232 and 234 are rotatably supported by bearings (not shown). The bearings can be provided on the center rail guide 220. The one pinion 232 is interposed between the sub-shift rail 212 and main shift rail 210, and the other pinion 234 is interposed between the sub-shift rail 214 and main shift rail 210. Further, as shown in FIG. 7, the pinions 232 and 234 have omitting portions 231 each in which teeth on the circumference is lacked. On the sub-shift rails 212 and 214 are formed rack portions 236 and 238. The rack portions 236 and 238 mesh with the pinions 232 and 234, respectively.

On the other hand, the main shift rail also has a pair of rack portions 240 and 242. These rack portions 240 and 242 are disposed apart from each other in the axial direction of the main shift rail 210 and mesh with the pinions 232 and 234, respectively. Flat surfaces 241 and 243 are formed on the outer surface of the main shift rail 210. As viewed in FIG. 7, the flat surface 241 extends from the rack portion 240 leftward at a predetermined distance, that is, up to the left end of the main shift rail 210. The flat surface 243 extends from the rack portion 242 rightward at a predetermined distance. Meanwhile, these rack portions 240 and 242 may be a continuous single rack portion.

When the shift actuator is in a state shown in FIG. 7, the rack portion 240 of the main shift rail 210 does not mesh with the pinion 232 and is located to the right side of the pinion 232 in FIG. 7. At this time, the teeth omitting portion 231 of the pinion 232 is located on the main shift rail 210, such that teeth on both ends of the omitting portion 231 are in contact with the flat surface 241 of the main shift rail 210. Therefore, the pinion 232 is prevented from its rotation by the flat surface 241 and at this time, the flat surface 214 functions as a stopper against the rotation of the pinion 232. On the contrary, the rack portion 242 of the main shift rail 210 meshes with the pinion 234. More specifically, as shown in FIG. 7, this mesh is achieved at the right end of the rack portion 242 and one end of teeth portion of the pinion 234. The teeth omitting portion 231 of the pinion 234 is adjacent to the mesh position in the counterclockwise direction of the pinion 234.

In the shift actuator 60 described above, the pair of the sub-shift rails 212 and 214 is fitted in the through hole 224 of the center rail guide 220. That is, as the the sub-shift rails 212 and 214 are disposed on the same axis, the actuator 60 having a compact configuration can be obtained, thereby achieving reduction of the size of the transfer unit 6. Further since the sub-shift rails 212 and 214 are disposed on the same axis, the supporting structure for these rails is simplified.

TRANSFER POSITION SWITCH

The aforementioned transfer position switch 114 will be described with reference to FIG. 7.

The transfer position switch 114 includes four switches 244, 246, 248 and 250, which are disposed on the center rail guide 220. Four mounting holes are formed on the outer surface of the center rail guide 220. Among these mounting holes, two mounting holes are disposed apart from each other in the axial direction of the through hole 228 and communicate with the through hole 228. The other two mounting holes are disposed apart from each other in the axial direction of the through hole 224 and communicate with the through hole 224.

Switches 244 and 246 are contained in the mounting holes on the through hole 228, respectively. Each of the switches 244 and 246 have a ball 252. The balls 252 are situated at the inside end of the corresponding mounting hole and urged toward the outer surface of the center rail guide 220. On the other hand, on the outer surface of the main shift rail 210 are formed holes 254a and 254b. These holes 254a and 254b are disposed apart from each other at a predetermined distance in the axial direction of the main shift rail 210. When the shift actuator 60 is in the state shown in FIG. 7, the ball 252 of the switch 244 is pushed into the mounting hole from the outer surface of the main shift actuator 210, so that the switch 244 outputs off signal to the ECU 94. On the other hand, the ball 252 of the switch 246 falls into the hole 254b so that the ball 252 is projected from the mounting hole. In this case, the switch 246 outputs on signal to the ECU 94.

Switches 248 and 250 are contained in the mounting holes on the through hole 224 and have the same structure as the aforementioned switches 244 and 246. The switches 248 and 250 cooperate with the sub-shift rails 214 and 212 outputting on signal or off signal to the ECU 94. When the shift actuator 60 is in the state shown in FIG. 7, the ball 252 of the switch 248 is pushed into the mounting hole from the outer surface of the sub-shift rail 214 and the switch 248 outputs off signal to the ECU 94. On the contrary, the ball 252 of the switch 250 falls into the hole 254d of the sub-shift rail 212 so that the ball 252 is projected from the mounting hole. The switch 250 outputs on signal to the ECU 94.

All the aforementioned switches 244–250 are incorporated in the center rail guide 220. Therefore, the transfer position switch 114 is formed as one unit in which the center rail guide 220 is a casing thereof.

DRIVE MODE IN TRANSFER UNIT

Respective drive modes of the transfer unit 6 and mode selection will be described in detail below.

FULL-TIME 4WD

When the shift actuator 60 is in the state shown in FIG. 7, the sub-shift rail 212 positions the coupling sleeve 56 of the auxiliary transmission mechanism 38 at the high gear position through the shift fork 58 of the sub-shift rail 212. On the other hand, the sub-shift rail 214 positions the coupling sleeve 82 of the transfer unit 6 at the full-time 4WD position through the shift fork 84 of the sub-shift rail 214.

Figure 8:
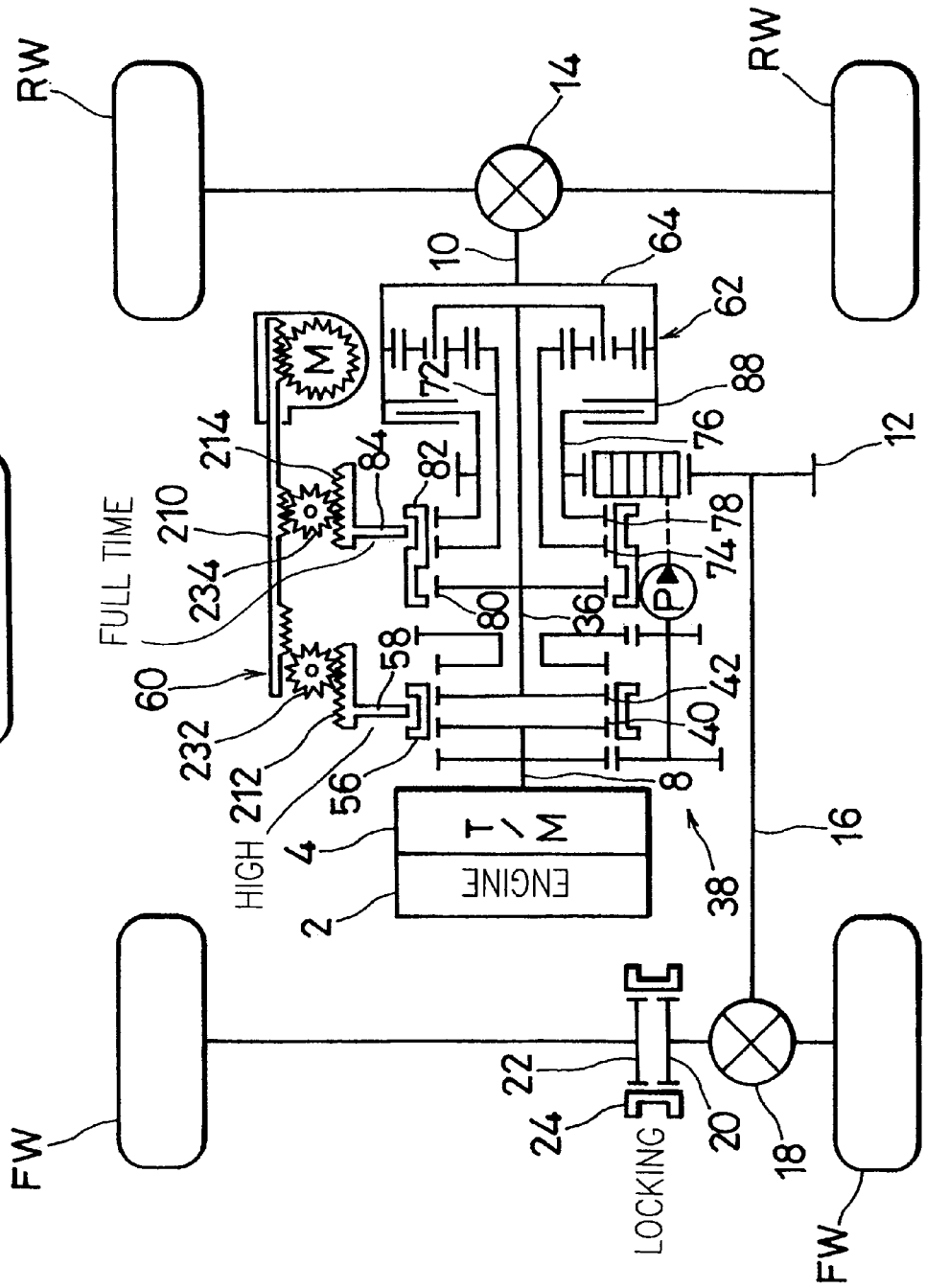
FIG. 8 is a schematic view of the transfer apparatus in full-time 4WD mode.

Therefore, as shown in FIG. 8, the coupling sleeve 56 couples the clutch gears 40 and 42 so that the input shaft 8 of the transfer unit 6 is directly connected to the intermediate shaft 36. On the other hand, the coupling sleeve 82 couples the clutch gears 74 and 78 so that the inner sleeve shaft 72 and outer sleeve shaft 76 are integrally rotatable.

In such full-time 4WD mode, a drive power supplied from the input shaft 8 to the intermediate shaft 36 is transmitted to the rear output shaft 10 through the center differential gear 62 so as to rotate the rear output shaft 10. The rotation of the rear output shaft 10 is transmitted to the right and left rear wheels RW through the rear propeller shaft and rear differential gear 14, so that the rear wheels RW are rotated.

On the other hand, the drive power of the intermediate shaft 36 is transmitted to the inner sleeve shaft 72 through the center differential gear 62 and then from the inner sleeve 4 shaft 72 to the front output sprocket 12 through the outer sleeve shaft 76, the sprocket 85 and the driving chain 86. Finally, the front output sprocket 12 is rotated. The rotation of the front output sprocket 12 is transmitted to the right and left front wheels FW through the front propeller shaft 16 and front differential gear 18, so that the front wheels FW are rotated. At this time, as shown in FIG. 8, the sleeve 24 of the right front axle is positioned at the locking position, so that the right and left front axles are connected to each other through the front differential gear 18.

When the vehicle starts on a steep slope, the load of the vehicle has been moved to the rear wheel side. However, the center differential gear 62, as described above, allocates the drive power of the front wheels FW and rear wheels in a ratio of 3:7, so that the drive power of the rear wheels RW is larger than that of the front wheels FW. Therefore, the vehicle can start smoothly even on the steep slope. If the vehicle is accelerated during a turning, the steering characteristic of the vehicle is changed to the neutral steering side so that the vehicle is capable of turning stably.

As described above, the ECU 94 is capable of controlling connection/disconnection of the hydraulic multiple disc clutch 88. Therefore, if the outer sleeve shaft 76 is connected to the casing 64 of the center differential gear 62 through the hydraulic multiple disc clutch 88, the differential function of the center differential gear 62 is limited.

Further, the ECU 94 is capable of changing the clutch pressure of the hydraulic multiple disc clutch 88, namely a torque transmission force of the hydraulic multiple disc clutch 88 arbitrarily. Therefore, the ECU 94 is capable of controlling the allocation of the drive power between the front wheels FW and the rear wheels RW freely in a range from 3:7 to 5:5. That is, by controlling appropriately the differential motion of the center differential gear 62, an optimum drive power to traveling condition of the vehicle can be allocated to the front wheels FW and rear wheels RW. Meanwhile, the control apparatus for controlling the differential motion of the center differential gear 62 has been disclosed in for example Japanese Unexamined Patent Application No.Sho62-261538 and Japanese Unexamined Patent Application No.Sho62-279137.

HIGH DIRECT COUPLING 4WD

If an instruction signal is sent from the ECU 94 to the electric motor 204 of the motor unit 202 and the pinion 206 of the electric motor 204 is rotated in a direction (counterclockwise as viewed in FIG. 7), the electric motor 204 moves the driving rack 208 or the main shift rail 210 leftward at a predetermined distance in FIG. 7. In this case, the rack portion 240 of the main shift rail 210 is moved toward the pinion 232, so that the rack portion 230 is located just before the pinion 232. On the other hand, the rack portion 242 of the main shift rail 210 rotates the pinion 234 clockwise as viewed in FIG. 7 and moves toward the through hole 228 of the center rail guide 220 so that the rack portion 242 leaves the pinion 234. The rotation of the pinion 234 moves the sub-shift rail 214 rightward. Consequently, the shift actuator 60 is changed from the state shown in FIG. 7 to a state shown in FIG. 9.

In this case, the shift fork 84 moves the coupling sleeve 82 of the transfer unit 6 from full-time 4WD position to direct coupling 4WD position. If the pinion 234 is removed from the rack portion 242, the teeth omitting portion 231 of the pinion 234 faces the flat surface 243 of the main shift rail 210, so that the rotation of the pinion 234 is stopped. Namely, like the case of the pinion 232 described previously, in the pinion 234, the teeth on both sides of the omitting portion 231 are in contact with the flat surface 243 so that the rotation of the pinion 234 is stopped.

At this time, the rotation of the pinion 232 is blocked by the flat surface 241 of the main shift rail 210 so that the sub-shift rail 212 is not moved.

While traveling of the main shift rail 210 and sub-shift rail 214 described above, as shown in FIG. 9, the ball 252 of the switch 246 escapes from the hole 254*b* in the main shift rail 210 so that the ball 252 is pushed into the mounting hole. Therefore, the switch 246 outputs off signal to the ECU 94. On the other hand, the ball 252 of the switch 248 falls into the hole 254*c* in the sub-shift rail 214 so that the ball 252 is pushed into the mounting hole. Then, the switch 248 outputs on signal to the ECU 94. In this case, the ECU 94 stops the rotation of the electric motor 204 when the output of the switch 248 is changed from off output to on output.

Figure 9:
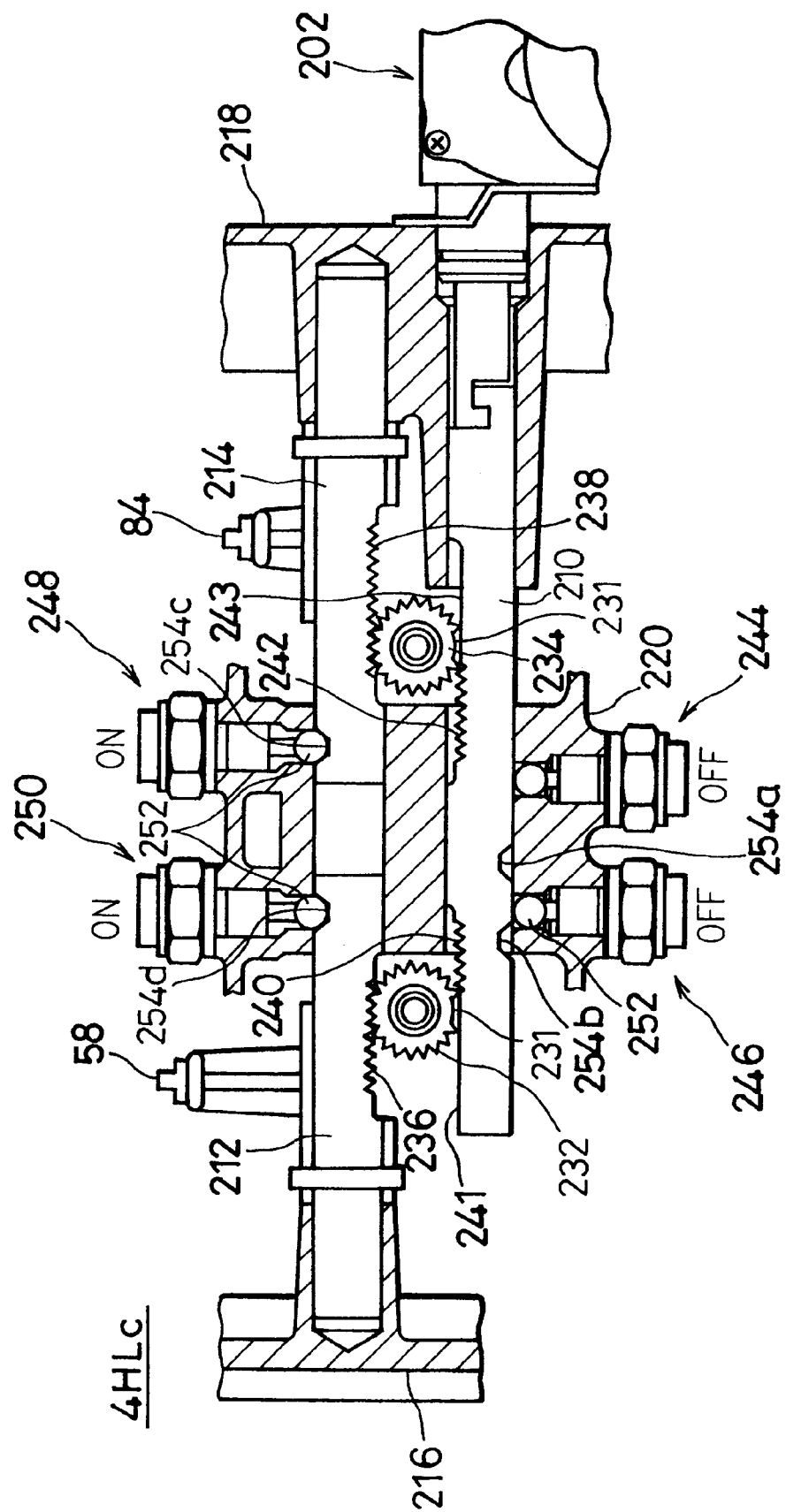
FIG. 9 is a longitudinally sectional view of the shift actuator changed to high direct-coupling 4WD.
Figure 10:
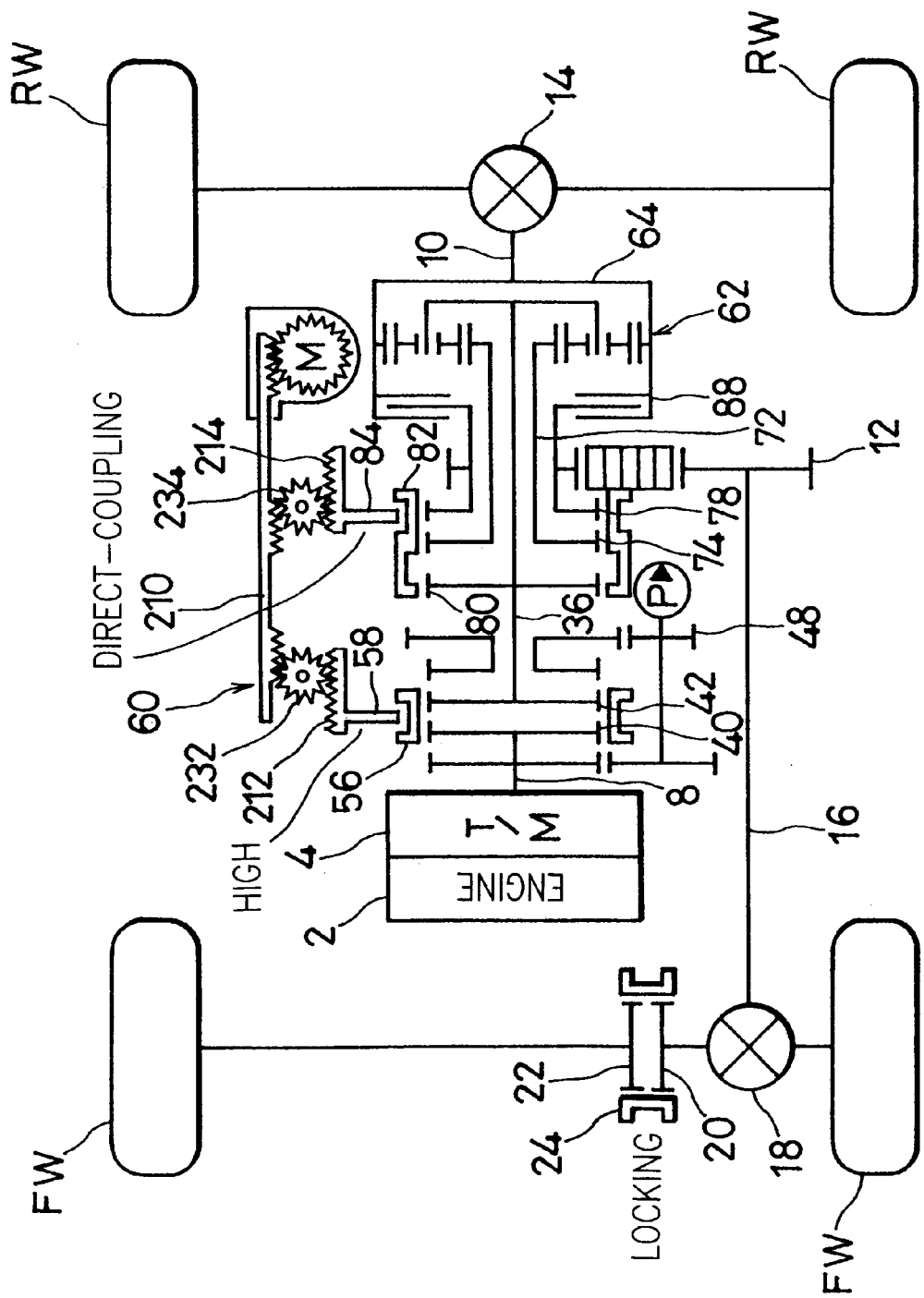
FIG. 10 is a schematic view of the transfer apparatus in high direct-coupling 4WD mode.

When the shift actuator 60 is in the state shown in FIG. 9, the transfer unit 6 is in the high direct coupling 4WD mode shown in FIG. 10. In this case, the coupling sleeve 82 of the transfer unit 6 connects the clutch gears 74 and 78, and the clutch gear 80 of the intermediate shaft 36 to each other. As the intermediate shaft 36 is directly connected to the inner sleeve shaft 72, the center differential gear 62 becomes into a locking state. Further, as the intermediate shaft 36 is also directly connected to the outer sleeve shaft 76, the front wheel FW driving system is directly connected mechanically to the rear wheel RW driving system. The drive power of the intermediate shaft 36 is thus allocated to the front wheels FW and rear wheels RW in the same ratio (about 5:5) as the load distribution thereof.

LOW DIRECT COUPLING 4WD

Figure 11:
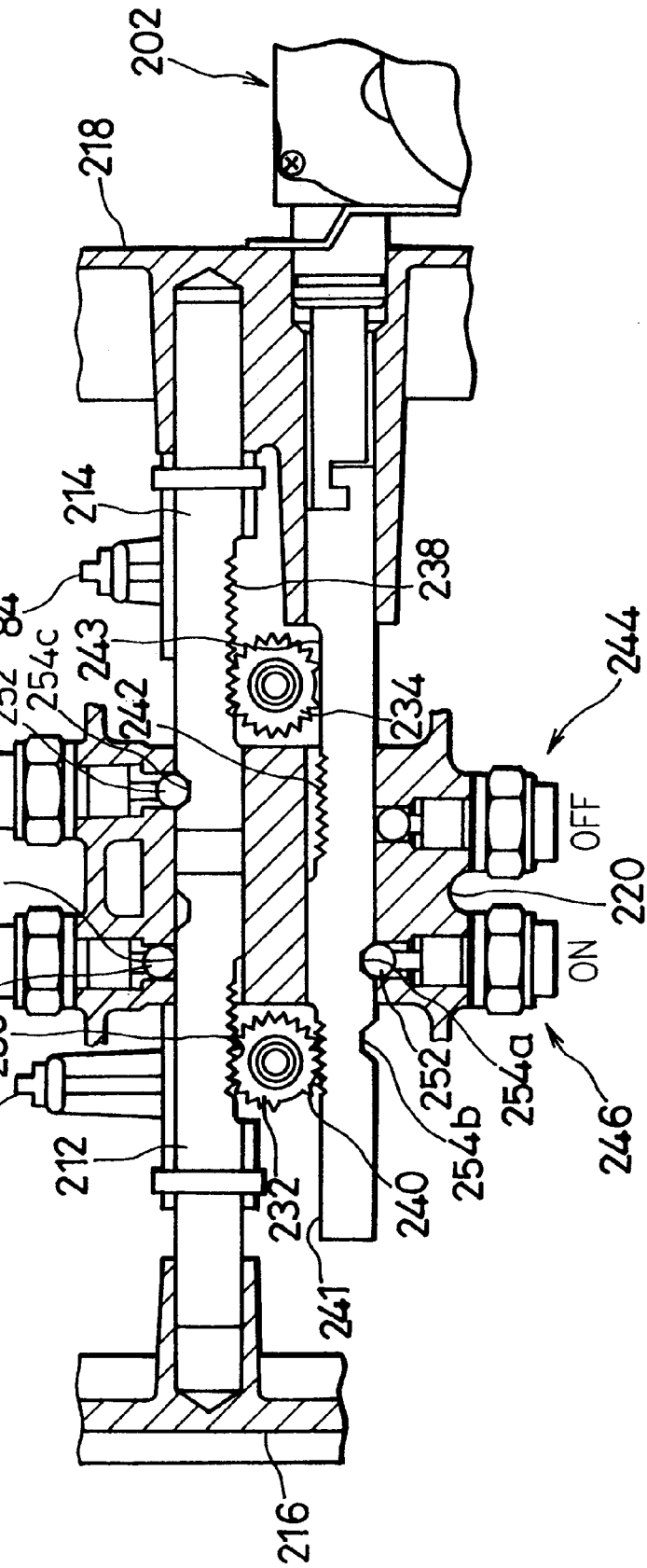
FIG. 11 is a longitudinally sectional view of the shift actuator changed to low direct-coupling 4WD mode.

When the shift actuator 60 is in the state shown in FIG. 9, if the electric motor 204 of the motor unit 202 is further rotated in the direction (counterclock as viewed in FIG. 7), the main shift rail 210 is further moved to the left side. Therefore, as shown in FIG. 11, the rack portion 240 of the main shift rail 210 meshes with the pinion 232 so that the pinion 232 is rotated clockwise. The rotation of the pinion 232 moves the sub-shift rail 212 to the right. Consequently, the shift fork 58 of the sub-shift rail 212 moves the coupling sleeve 56 of the auxiliary transmission mechanism 38 from high gear position to low gear position. At this time, since the pinion 234 meshes with the rack portion 242 of the main shift rail 210 and the rotation thereof is blocked by the flat surface 243 of the main shift rail 210, the sub-shift rail 214 is not moved. Consequently, the shift fork 84 of the sub-shift rail 214 keeps the coupling sleeve 82 of the transfer unit 6 at the direct coupling 4WD position.

While traveling of the main shift rail 210 and the sub-shift rail 212 described above, the ball 252 of the switch 246 falls into the hole 254*a* of the main shift rail 210 so that the ball 252 projects out of the mounting hole and the switch 246 outputs on signal to the ECU 94. The ball 252 of the switch 250 escapes from the hole 254*d* of the sub-shift rail 212 so that the ball 252 is pushed into the mounting hole and the switch 250 outputs off signal to the ECU 94. When the output of the switch 246 is changed from off to on, the ECU 94 stops the rotation of the electric motor 204.

Figure 12:
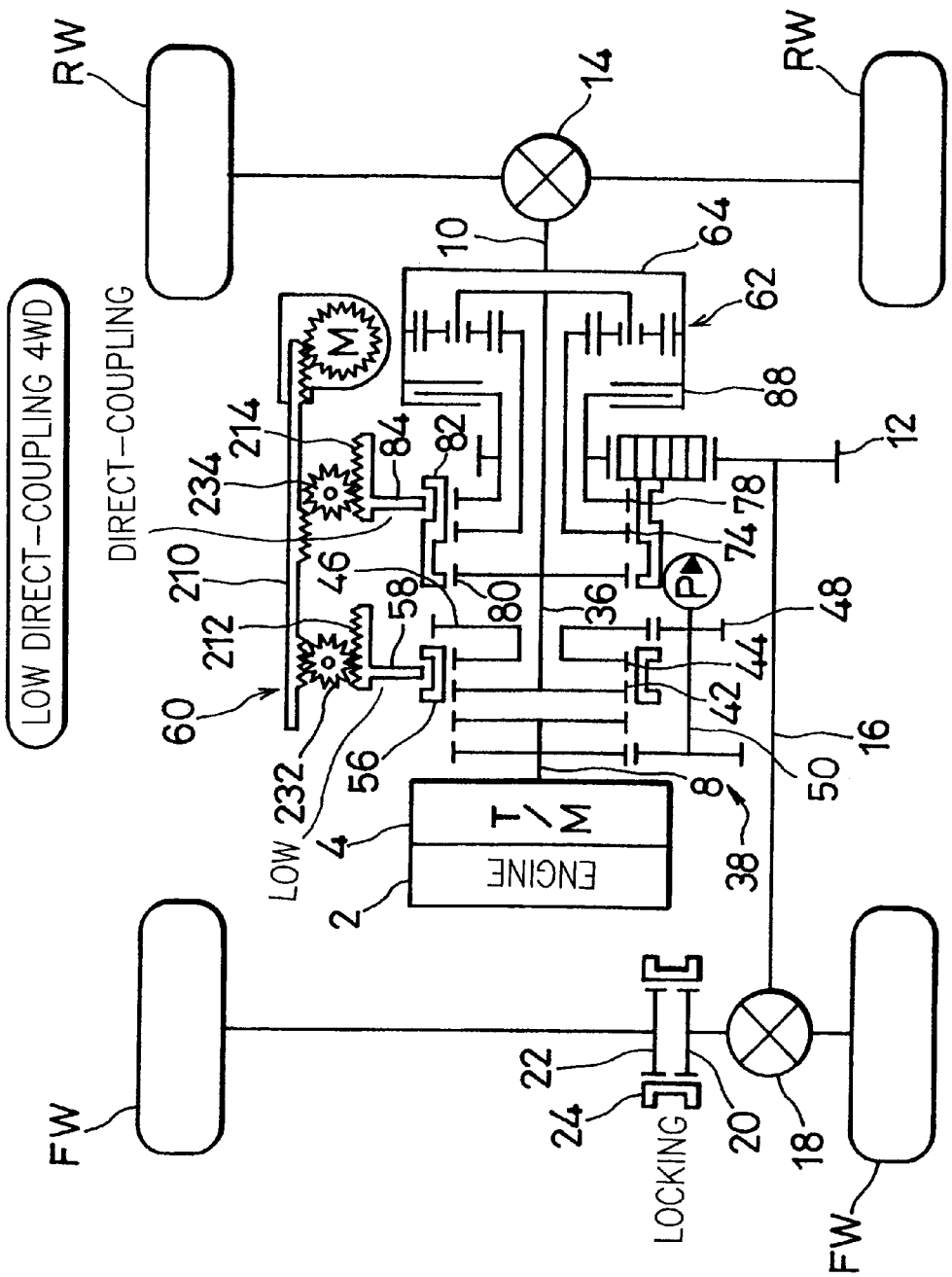
FIG. 12 is a schematic view of the transfer apparatus in low direct-coupling 4WD mode.

In this case, as shown in FIG. 12, the coupling sleeve 56 of the auxiliary transmission mechanism 38 is moved from the high gear position to the low gear position so that the clutch gears 42 and 44 are connected to each other. Therefore, the drive power of the input shaft 8 is transmitted from the counter shaft 50 to the intermediate shaft 36 through the low gear 46 and clutch gears 44 and 42, thereby reducing the rotation speed of the intermediate shaft 36. The transmission of the drive power to the rear wheels and front wheels from the intermediate shaft 36 is the same as at the case of high direct coupling 4WD described above.

The coupling sleeve 56 is shifted when the vehicle is stopped.

2WD

Figure 13:
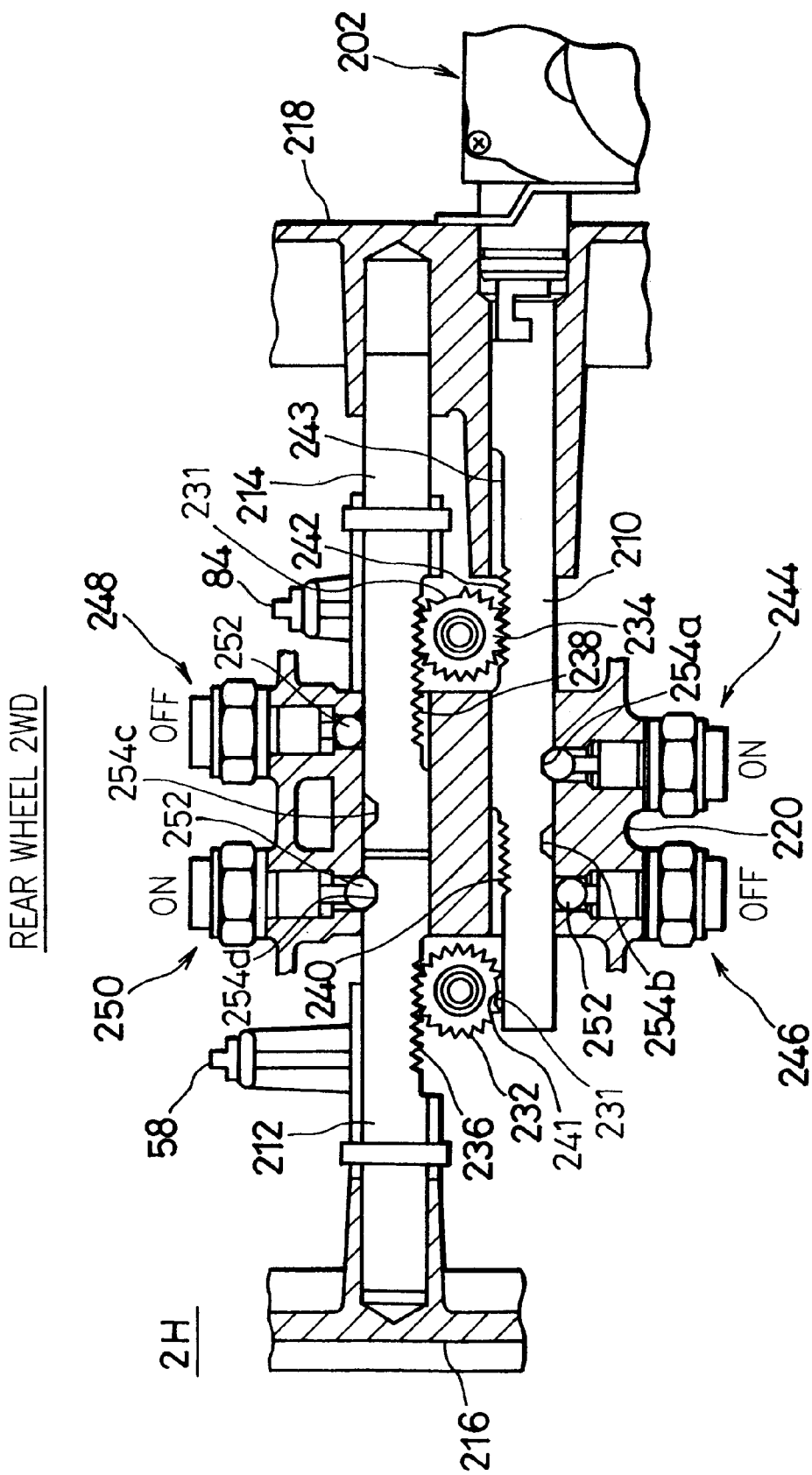
FIG. 13 is a longitudinally sectional view of the shift actuator changed to 2WD mode.

When the shift actuator 60 is in the state shown in FIG. 7, if the electric motor 204 of the motor unit 202 is rotated in reverse direction (clockwise as viewed in FIG. 7), the main shift rail 210 is moved to the right. In this case, the rack portion 242 of the main shift rail 210 meshes with the pinion 234, so that the rack portion 242 rotates the pinion 234 counterclockwise. This rotation moves the sub-shift rail 214 leftward as shown in FIG. 13. Therefore, the shift fork 84 of the sub-shift rail 214 moves the coupling sleeve 82 of the transfer unit 6 from the full-time 4WD position to the 2WD position, so that the coupling sleeve 82 connects the clutch gear 80 of the intermediate shaft 36 to the clutch gear 74 of the inner sleeve shaft 72. At this time, the pinion 232 does not mesh with the rack portion 240 of the main shift rail 210 and the rotation thereof is blocked by the flat surface 241 of the main shift rail 210. Therefore, the sub-shift rail 212 is not moved and the shift fork 58 of the sub-shift rail 212 keeps the coupling sleeve 56 of the auxiliary transmission mechanism 38 at the high gear position.

While traveling of the main shift rail 210 and sub-shift rail 214, the ball 252 of the switch 244 falls into the hole 254*a* in the main shift rail 210 so that the ball projects out of the mounting hole. The switch 244 outputs on signal to the ECU 94. On the other hand, the ball 252 of the switch 246 escapes from the hole 254*b* of the main shift rail 210 so that the ball 252 is pushed into the mounting hole and the switch 246 outputs off signal to the ECU 94. When the output of the switch 244 is changed from off to on, the ECU 94 stops the rotation of the electric motor 204.

Figure 14:
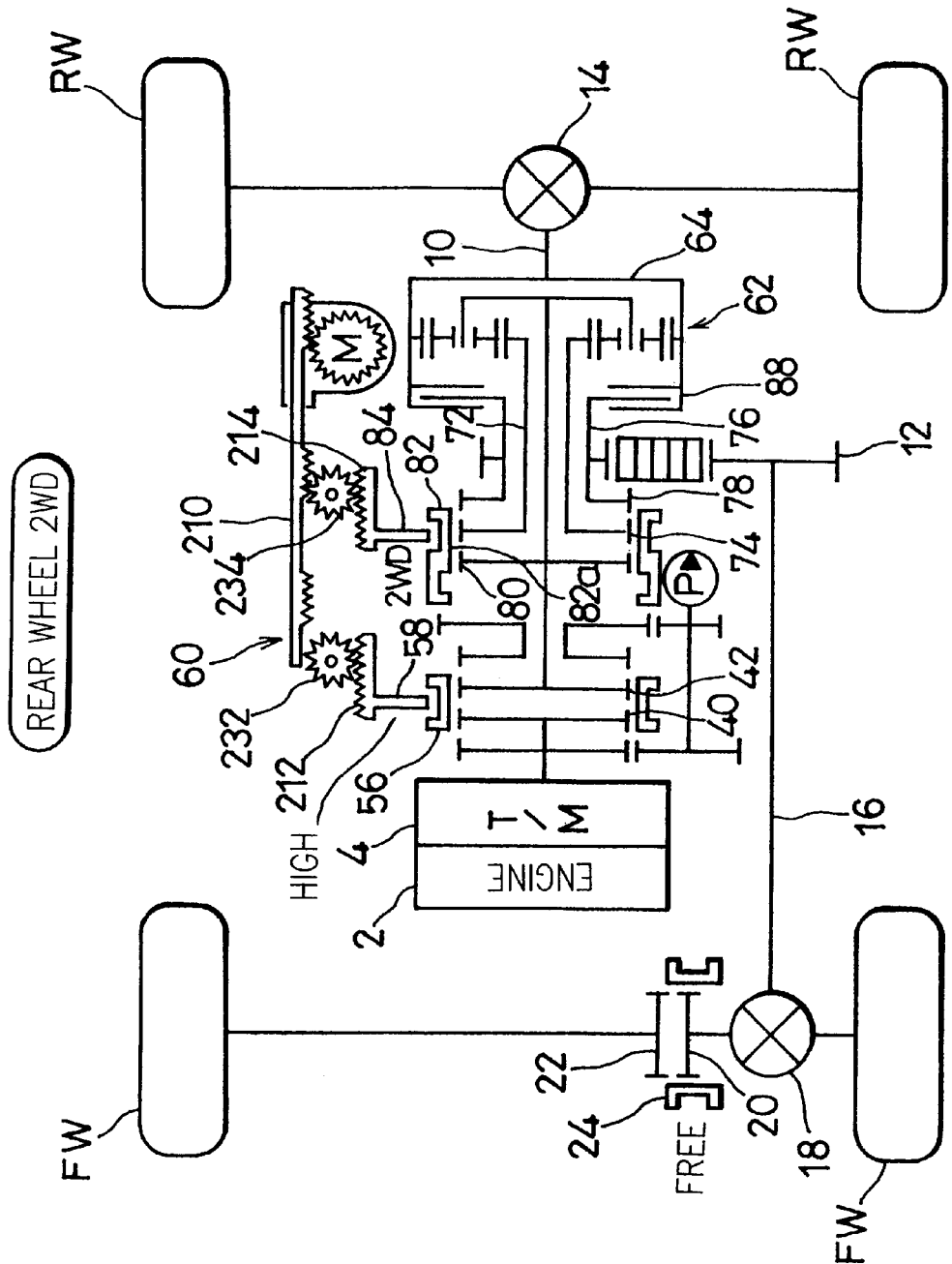
FIG. 14 is a schematic view showing the transfer apparatus in 2WD mode.

When the shift actuator 60 is at the 2WD position, the coupling sleeve 82 of the transfer unit 6 connects the clutch gear 80 of the intermediate shaft 36 to the clutch gear 74 of the inner sleeve shaft 72 as shown in FIG. 14. Therefore, the center differential gear 62 is in locking state. At this time, if the connection at the hydraulic multiple disc clutch 88 is released, the drive power of the intermediate shaft 36 is transmitted to only the rear output shaft 10 through the center differential gear 62. In this case, the drive power of the intermediate shaft 36 is not transmitted to the front output sprocket 85. Consequently, only the right and left rear wheels RW are driven.

At this time, the ECU 94 drives the vacuum actuator 32 and as shown in FIG. 14, the coupling sleeve 24 is moved to free position. Therefore, the connection between the clutch gears 20 and 22 of the right front axle is released and the rotation of the front propeller shaft 16 is therefore stopped. If the rotation of the front propeller shaft 16 is halted, not only consumption of fuel is reduced but also noise accompanied by the rotation of the front propeller shaft 16 is eliminated.

DETECTION OF SHIFT POSITION OF SHIFT ACTUATOR

As evident from the description above, the ECU 94 is capable of detecting a shift position of the shift actuator 60 from combination of outputs of four switches 244, 246, 248 and 250 of the transfer position switch 114 shown in Table 1 below.

TABLE 1

| Shift position | Switch 244 | Switch 246 | Switch 248 | Switch 250 |
| --- | --- | --- | --- | --- |
| 2WD | on | off | off | on |
| full-time 4WD | off | on | off | on |
| high direct coupling 4WD | off | off | on | on |
| low direct coupling 4WD | off | on | on | off |

The transfer position switch 114 includes four switches 246–250 for detecting four shift positions. However, as evident from Table 1, the transfer position switch 114 is capable of identifying the four positions according to a combination of the outputs of the three switches even if any one of the switches 246–250 is omitted.

As evident from the above description, the selection of the shift position by the shift actuator 60 is carried out by the main shift rail 210. The traveling ranges of the main shift rail 210 that are required for selecting the shift positions are continuous in the axial direction of the main shift rail 210. However, the traveling ranges of the main shift rail 210 corresponding to the selection of each shift position may be divided or part thereof may be overlapped with each other.

MANUAL MODE

The aforementioned full-time 4WD, high direct coupling 4WD, low direct coupling 4WD and 2WD correspond to 4H position, 4HLc position, 4LLc position and 2H position of the mode selection switch 115. When the mode selection switch 115 is selected to any one of the 4H position, 4HLc position, 4LLc position and 2H position, the ECU 94 controls the operation of the shift actuator 60 and changes or sets the driving mode of the transfer unit 6 corresponding to an operating position selected by the mode selection switch 115. Change-over of the driving mode in the transfer unit 6 can be carried out only by the operation of the mode selection switch. The driving mode of the transfer unit 6 can be changed over easily.

AUTO MODE

When the mode selection switch 115 of the aforementioned instrumental panel is located at AUTO position, the ECU 94 actuates the shift actuator 60 corresponding to traveling condition of the vehicle. The driving mode of the transfer unit 6 can be changed over as follows, with the full-time 4WD on the base mode.

(1) Full-time 4WD

When the ignition key switch of the engine 2 is turned on, the ECU 94 actuates the shift actuator 60 in the operating condition shown in FIG. 7, so that the driving mode of the transfer unit 6 is set to full-time 4WD.

(2) Full-time 4WD→2WD

When the following conditions a)–c) are satisfied, the driving mode of the transfer unit 6 is changed from full-time 4WD to 2WD.

a) The speed of the vehicle is in low and medium ranges.

b) The road on which the vehicle travels is a flat paved road such as asphalt road.

c) The steering wheel is not operated or being operated smoothly.

(3) 2WD→full-time 4WD

When at least one of the following conditions d)–g) below is satisfied, the driving mode of the transfer unit 6 is changed from 2WD to full-time 4WD.

d) The traveling speed of the vehicle is in high range.

e) The vehicle traveling road is slope, gravel road, bad road or snowy road.

f) The steering wheel is operated rapidly.

g) The slips of wheels are large.

(4) Full-time 4WD→high direct coupling 4WD

When the traveling speed of the vehicle is in low range and one of the following conditions h), i) are satisfied, the driving mode of the transfer unit 6 is changed from full-time 4WD to high direct-coupling 4WD.

h) The vehicle traveling road is steep slope or extremely bad road.

i) The slips of wheels are continuously large.

(5) High direct-coupling 4WD→full-time 4WD

When the traveling speed of the vehicle is changed to high range, the driving mode of the transfer unit 6 is changed from high direct-coupling 4WD to full-time 4WD.

If as described above, the mode selection switch 115 is set to AUTO position, the driving mode of the transfer unit 6 is automatically changed to a driving mode optimum to traveling condition of the vehicle so that easy drive of the vehicle is enabled.

EXAMPLES AS TO CHANGE OF THE DRIVING MODE IN TRANSFER UNIT 2WD↔TEMPORARY 4WD

When the vehicle is traveling in 2WD mode, as described above, the coupling sleeve 24 releases the connection between the clutch gears 20 and 24 and the coupling sleeve 82 connects the clutch gears 80 and 74 to each other, while releasing the connection between the clutch gears 78 and 74. At this time, the rotation of the front propeller shaft 16 is stopped.

If, under such a traveling condition, the ECU 94 receives an instruction of temporary change-over to 4WD mode suddenly, first the ECU 94 actuates the hydraulic multiple disc clutch 88 so that the casing 64 of the center differential gear 62 is connected to the outer sleeve shaft 76. Therefore, the outer sleeve shaft 76 is rotated with the casing 64. The rotation of the outer sleeve shaft 76 rotates the front propeller shaft 16 through the sprocket 85, driving chain 86 and front output sprocket 12. The front propeller shaft 16 thus rotates the casing of the front differential gear 18, so that the rotation of the clutch gear 20 of the right front axle is changed to the forward direction of the vehicle. That is, when the rotation of the front propeller shaft 16 is stopped, the clutch gear 20 is rotating in the backward direction of the vehicle. However, if the front propeller shaft 16 is rotated, the rotation direction of the clutch gear 20 is reversed.

After that, the ECU 94 receives output signals from the aforementioned rotation speed sensors 104 and 106 (see FIG. 1) and calculates rotation speeds of the right front wheel FW and front propeller shaft 16 or a difference in rotation speed between the right front wheel FW and the front propeller shaft 16 according to these output signals. Then, the ECU 94 controls clutch pressure of the hydraulic multiple disc clutch 88 or the rotation speed of the front propeller shaft 16 according to the calculated difference in rotation speed so as to maintain the rotations of the clutch gears 20 and 22 in substantially synchronous condition.

If the ECU 94 releases the operation of the vacuum actuator 28 at this time, the coupling sleeve 24 returns from the free position to the locking position, so that the clutch gears 20 and 22 are connected to each other. Thus, the rotation of the front propeller shaft 16 is transmitted to the right and left front wheels FW through the front differential gear 18. After that, the ECU 94 adjusts the clutch pressure of the hydraulic multiple disc clutch 88 or the torque transmission force thereof and then allocates a required drive power to the front wheels FW. As a result, the traveling mode of the vehicle is temporarily changed from 2WD to a mode equivalent to 4WD.

Then, when the hydraulic multiple disc clutch 88 completely connects the casing 64 of the center differential gear 62 to the outer sleeve shaft 76, the driving system of the front wheels FW is directly connected to the driving system of the rear wheels RW. In this case, the traveling mode is temporarily changed from 2WD to a mode equivalent to direct-coupling 4WD.

After that, if the instruction of temporarily changing to 4WD is released, the ECU 94 actuates the vacuum actuator 28 again. Thus, the coupling sleeve 24 is moved from the locking position to the free position, so that the connection between the clutch gears 20 and 22 is released. After that, the ECU 94 releases the connection by the hydraulic multiple disc clutch 88. Consequently, the front propeller shaft 16 is stopped again, so that the traveling mode of the vehicle is returned from the temporary 4WD to normal 2WD.

As described above, during traveling at 2WD mode, the ECU 94 is capable of establishing the connection between the clutch gears 20 and 22 through the coupling sleeve 24 by controlling the clutch pressure of the hydraulic multiple disc clutch 88. As a result, even if the temporary 4WD mode is requested suddenly during traveling at 2WD, the traveling mode can be changed to the temporary 4WD quickly.

2WD→FULL-TIME 4WD

If a change-over signal for changing the traveling mode of the vehicle from 2WD to normal full-time 4WD is supplied to the ECU 94, first the ECU 94 changes the traveling mode of the vehicle from 2WD to temporary 4WD as described above.

After that, the ECU 94 receives output signal from the aforementioned rotation speed sensors 106 and 108 (see FIG. 1), the ECU 94 calculates the rotation speed of the front propeller shaft 16 and the rotation speed of the counter shaft 50, namely, a difference in rotation speed between the front propeller shaft 16 and counter shaft 50 according to these output signals. Then, the ECU 94 adjusts the clutch pressure of the hydraulic multiple disc clutch 88 according to the calculated difference in rotation speed so as to keep the rotations of the clutch gear 74 (on the side of the counter shaft 50) of the inner sleeve shaft 72 and clutch gear 78 (on the side of the front propeller shaft 16) of the outer sleeve shaft 76 in substantially synchronous condition. Although the center differential gear 62 becomes the state near locking, the hydraulic multiple disc clutch 88 allows a relative rotation between the clutch gears 74 and 78.

After that, the ECU 94 drives the shift actuator 60 so as to move the coupling sleeve 82 of the transfer unit 6 from the 2WD position to the full-time 4WD position. That is, the inner gear 82a of the coupling sleeve 82 is moved to the side of the clutch gear 78. When a difference in the rotation phase between the clutch gears 74 and 78 falls under an allowable range, the inner gear 82a begins to mesh with the clutch gear 78, so that the clutch gears 74, 78 and 80 are connected to each other temporarily. If the inner gear 82a is further moved toward the side of the clutch gear 78, the mesh between the inner gear 82a and clutch gear 80 is released so that the inner gear 82a meshes with only the clutch gears 74 and 78. At this time, the shift from 2WD to the full-time 4WD is completed.

As described above, when the shift from 2WD to full-time 4WD is carried out, the hydraulic multiple disc clutch 88 allows the relative rotation between the clutch gears 74 and 78. Thus, the inner gear 82a of the coupling sleeve 82 smoothly meshes with the clutch gear 78. On the contrary, if the center differential gear 62 is completely in locking condition such that the relative rotation between the clutch gears 74 and 78 is not allowed, the inner gear 82a strikes the clutch gear 78 so that the mesh therebetween is disabled.

If the shift to the full-time 4WD position is completed, the clutch pressure of the hydraulic multiple disc clutch 88 is released. After that, when the vehicle is traveling in full-time 4WD mode, the ECU 94 adjusts the clutch pressure of the hydraulic multiple disc clutch 88 so that the drive power can be allocated to the front wheels FW and rear wheels RW depending on the traveling condition of the vehicle.

FULL-TIME 4WD→DIRECT COUPLING 4WD

When an instruction signal for changing the traveling mode from full-time 4WD to direct-coupling 4WD is supplied to the ECU 94, first the ECU 94 calculates a difference in rotation speed between the front propeller shaft 16 and counter shaft 50 according to the output signals of the rotation speed sensors 106 and 108. Then, the ECU 94 adjusts the clutch pressure of the hydraulic multiple disc clutch 88 according to the calculated difference in the rotation speed so as to keep the rotations of the clutch gears 74 and 80 in substantially synchronous condition. After this, the ECU 94 drives the shift actuator 60 so as to move the coupling sleeve 82 from the full-time4WD position to the direct-coupling 4WD position. In this case, the inner gear 82b of the coupling sleeve 82 is moved toward the clutch gear 80, so that the inner gear 82b smoothly meshes with the clutch gear 80. Consequently, the coupling sleeve 80 connects the clutch gears 74, 78 and 80 as described above. After that, the ECU 94 releases the clutch pressure of the hydraulic multiple disc clutch 88.

As described above, by adjusting the clutch pressure of the hydraulic multiple disc clutch 88, the rotations of the clutch gears 74 and 80 can be made substantially synchronous with each other. Thus, the coupling sleeve 82 can be smoothly moved so that the change-over from the full-time 4WD position to the direct-coupling 4WD position is smoothly carried out. Even if the clutch pressure of the hydraulic multiple disc clutch 88 is released after the coupling sleeve 82 is moved to the direct-coupling 4WD position, the coupling sleeve 82 keeps the connection of the clutch gears 74, 78 and 80. Therefore, drive powers equal to the loading distribution of the front wheels FW and rear wheels RW are allocated to the front wheels FW and rear wheels RW. At this time, it is not necessary to supply the clutch pressure to the hydraulic multiple disc clutch 88, thereby reducing consumption of energy, that is, energy loss.

DIRECT-COUPLING 4WD→FULL-TIME 4WD

If an instruction signal for changing the traveling mode of the vehicle from direct-coupling 4WD to full-time 4WD is supplied to the ECU 94, the ECU 94 can move the shift actuator 60 immediately without actuating the hydraulic multiple disc clutch 88. That is, the coupling sleeve 82 is moved from the direct-coupling 4WD position to the full-time 4WD position, so that the mesh between the inner gear 82b and clutch gear 80 is released and the coupling sleeve 82 connects only the clutch gears 74 and 78. Consequently, the traveling mode of the vehicle is changed from direct-coupling 4WD to full-time 4WD. After this, the ECU 94 adjusts the clutch pressure of the hydraulic multiple disc clutch 88 so that a drive power to the front wheels FW and rear wheels RW is allocated optimally depending on the traveling condition of the vehicle.

In this case, the ECU may adjust the clutch pressure of the hydraulic multiple disc clutch 88 before driving the shift actuator 60 so as to synchronize the rotations of the clutch gears 74 and 80. After a shift to the full-time 4WD is completed, the ECU 94 released the clutch pressure of the hydraulic multiple disc clutch 88. After this, the ECU 94 adjusts the clutch pressure of the hydraulic multiple disc clutch 88 so as to distribute the driving force to the front wheels FW and wheels RW optionally depending on the traveling condition of the vehicle.

FULL-TIME 4WD→2WD

If an instruction signal for changing the traveling mode from full-time 4WD to 2WD is supplied to the ECU 94, first the ECU 94 adjusts the clutch pressure of the hydraulic multiple disc clutch 88 and keeps the rotations of the clutch gears 74, 78 and 80 in substantially synchronous condition. After this, the ECU 94 drives the shift actuator 60 so that the coupling sleeve 82 is moved from the full-time 4WD to the 2WD position. Therefore, the inner gear 82a of the coupling sleeve 82 connects the clutch gears 74, 78 and 80 to each other temporarily and then while keeping only the connection between the clutch gears 74 and 80, the mesh between the inner gear 82a and clutch gear 78 is released.

After that, the ECU 94 drives the vacuum actuator 28 so as to release the connection between the clutch gears 20 and 22 by the coupling sleeve 24 and then releases the clutch pressure of the hydraulic multiple disc clutch 88. Since the releasing of the connection between the clutch gears 20 and 22 is carried out ahead of releasing of the clutch pressure, no reverse rotation force is applied to the clutch gear 20, so that the coupling sleeve 24 can be moved smoothly.

As described above, the rotations of the clutch gears 74, 78 and 80 are made synchronous with each other by an action of the hydraulic multiple disc clutch 88 and then the coupling sleeve 82 is moved. Therefore, the coupling sleeve 82 can be smoothly moved, so that change-over from the full-time 4WD to 2WD is carried out easily.

The present invention is not restricted to the aforementioned transfer unit 6 according to the first embodiment but may be modified in various ways. Modifications of the transfer unit will be described below. For description of the modifications, the same reference numerals are attached to positions and members having the same function as the positions and members of the first embodiment and already described modifications, and a description thereof is omitted while only different points will be described.

TRANSFER UNIT ACCORDING TO A SECOND EMBODIMENT

Figure 15:
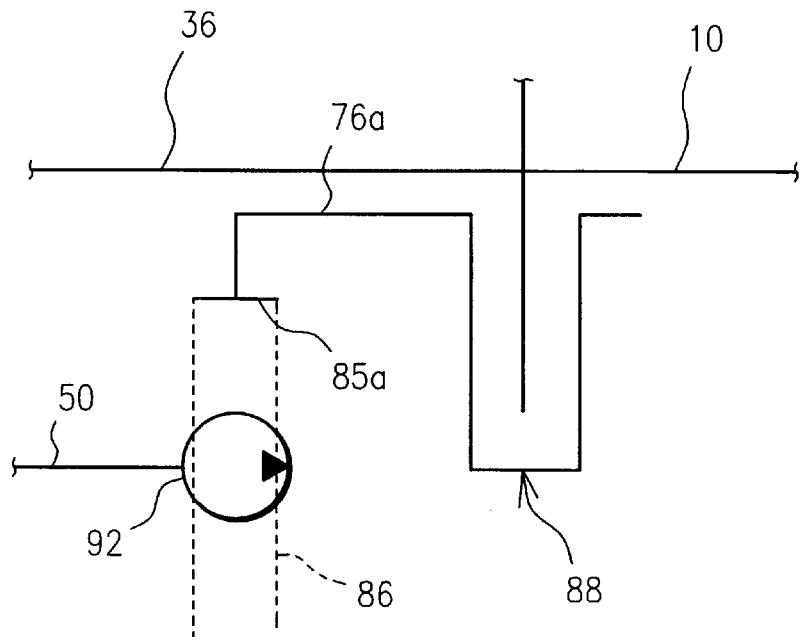
FIG. 15 is a schematic view showing a part of the transfer apparatus according to the second embodiment.

As shown in FIG. 15, the transfer unit does not include the center differential gear 62. In this case, the intermediate shaft 36 is directly connected to the rear output shaft 10, so that the driving mode of the transfer unit can be changed only between 2WD and 4WD.

More specifically, the transfer unit includes a sleeve shaft 76a rotatably mounted on the intermediate shaft 36. The hydraulic multiple disc clutch 88 is disposed between the sleeve shaft 76a and the intermediate shaft 36. A sprocket 85a is mounted on an end of the sleeve shaft 76a and the sprocket 85a is connected to the front output sprocket 12 through the driving chain 86.

In the transfer unit according to the second embodiment, when no clutch pressure is supplied to the hydraulic multiple disc clutch 88, the drive power of the intermediate shaft 36 is transmitted to only the right and left rear wheels RW, so that the vehicle travels in 2WD mode. On the contrary, if the clutch pressure is supplied to the hydraulic multiple disc clutch 88 so that the hydraulic multiple disc clutch 88 connects the intermediate shaft 36 and sleeve shaft 76a to each other. Consequently, the drive power is transmitted from the intermediate shaft 36 to the right and left front wheels FW as well. In this case, the vehicle travels in 4WD mode. The ECU 94 controls the allocation of the drive power to the front wheels FW and rear wheels RW by adjusting torque transmission force of the hydraulic multiple disc clutch 88.

The hydraulic pump 92 is connected to the end portion of the counter shaft 50 on the side of the hydraulic multiple disc clutch 88 such that the pump 92 is disposed in dead space within the driving chain 86. Therefore, not only the hydraulic path between the hydraulic pump 92 and hydraulic multiple disc clutch 88 can be reduced, but also the transfer unit can be made compact.

TRANSFER UNIT ACCORDING TO A THIRD EMBODIMENT

Figure 16:
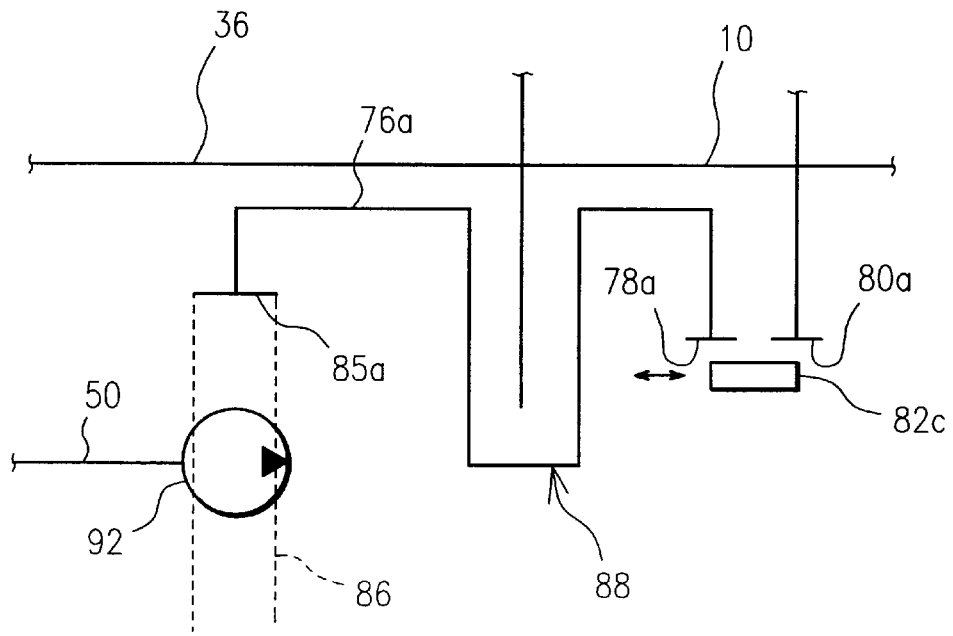
FIG. 16 is a schematic view showing a part of the transfer apparatus according to the third embodiment.
Figure 17:
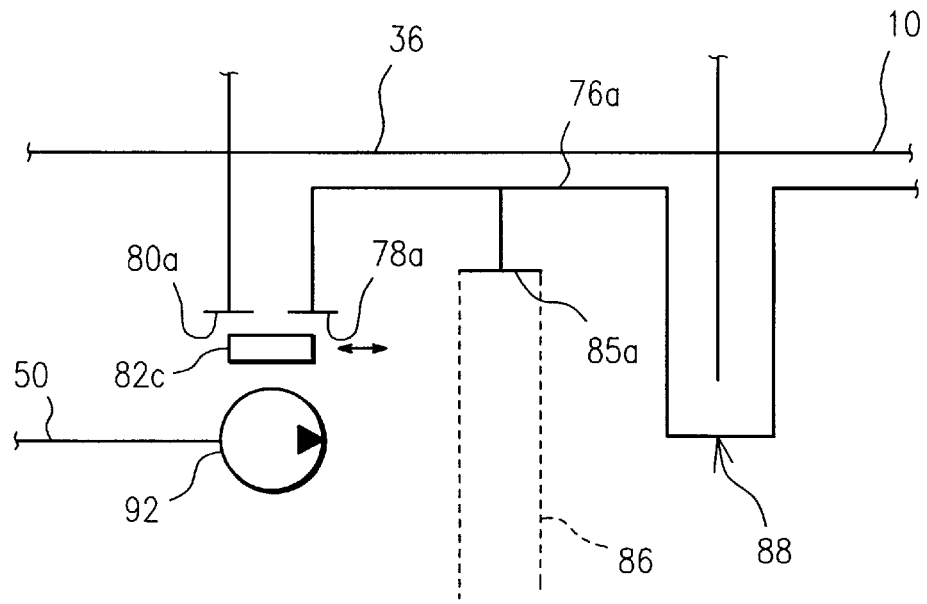
FIG. 17 is a schematic view showing a part of the transfer apparatus according to the fourth embodiment.

A transfer unit shown in FIG. 16 is obtained by adding clutch gears 78a and 80a, and a coupling sleeve 82c for making/releasing connection between these clutch gears 78a and 80a to the transfer unit according to the second embodiment. In this case, the transfer unit has 2WD, 4WD and direct-coupling 4WD driving modes.

More specifically, the clutch gear 78a is mounted on the other end of the sleeve shaft 76a and the clutch gear 78a is mounted on the rear output shaft 10. Then, the coupling sleeve 82c is disposed outside the clutch gears 78a and 90a.

The driving mode of the transfer unit according to the third embodiment is changed between 2WD and 4WD like the second embodiment. When the coupling sleeve 82c connects the clutch gears 78a and 80 to each other, the driving mode of the transfer unit 6 is changed to direct-coupling 4WD.

In the third embodiment, a disposition of the hydraulic pump is the same as the second embodiment. Therefore, the transfer unit of the third embodiment has the same advantage as the second embodiment.

TRANSFER UNIT ACCORDING TO A FOURTH EMBODIMENT

The transfer unit according to the fourth embodiment shown in FIG. 7 has such driving modes as 2WD, 4WD and direct-coupling 4WD like the transfer unit according to the third embodiment. However, in the transfer unit according to the fourth embodiment unlike the third embodiment, the clutch gear 78*a* is mounted on the one end of the sleeve shaft 76*a*. A sprocket 85*a* is mounted on the sleeve shaft 76*a* and is located between the clutch gear 78*a* and hydraulic multiple disc clutch 88. The clutch gear 80*a* is mounted on the intermediate shaft 36. In this case, the clutch gears 78*a*, 80*a* and coupling sleeve 82*c* are disposed on the side of the auxiliary transmission mechanism 38.

TRANSFER UNIT ACCORDING TO A FIFTH EMBODIMENT

Figure 18:
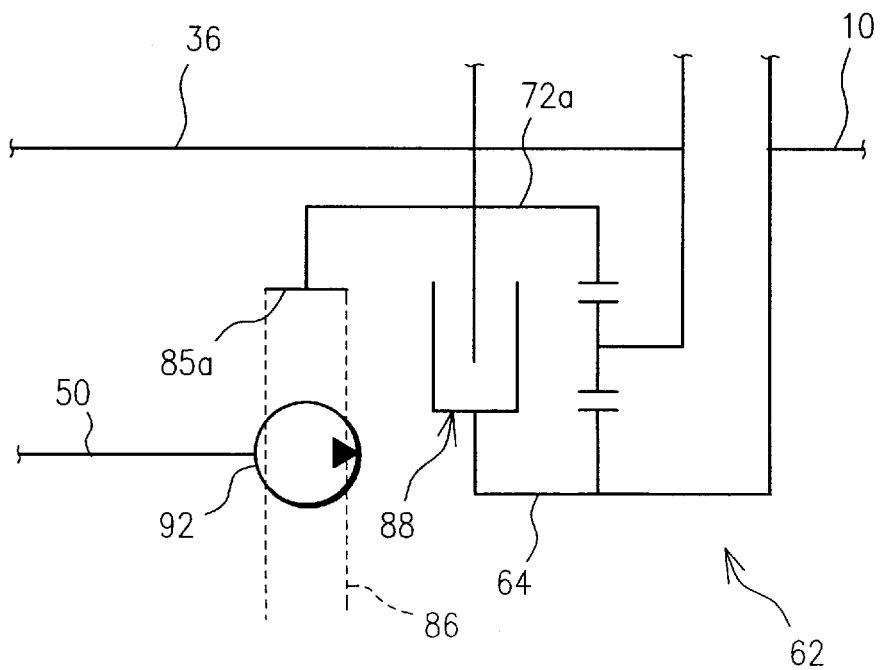
FIG. 18 is a schematic view showing a part of the transfer apparatus according to the fifth embodiment.

The transfer unit according to the fifth embodiment shown in FIG. 18 does not have the outer sleeve shaft 76 of the transfer unit 6 of the first embodiment. The sprocket 85*a* and hydraulic multiple disc clutch 88 are mounted on the sleeve shaft 72*a* that corresponds to the inner sleeve shaft 72. The transfer unit according to the fifth embodiment has full-time 4WD and direct-coupling 4WD driving modes.

When no clutch pressure is supplied to the hydraulic multiple disc clutch 88, the driving mode of the transfer unit is full-time 4WD. At this time, when the clutch pressure is supplied to the hydraulic multiple disc clutch 88, the allocation of the drive power to be transmitted to the front wheels FW and rear wheels RW from the center differential gear 62 is changed. When the hydraulic multiple disc clutch 88 connects the casing 64 of the center differential gear 62 and sleeve shaft 72*a* to each other completely, the driving mode of the transfer unit is changed to direct-coupling 4WD. At this time, the allocation of the drive power to the front wheels FW and rear wheels RW is substantially 5:5.

In the transfer unit of the fifth embodiment also, the hydraulic pump 92 is disposed in the dead space within the driving chain 86, between the counter shaft 50 and hydraulic multiple disc clutch 88.

TRANSFER UNIT ACCORDING TO A SIXTH EMBODIMENT

Figure 19:
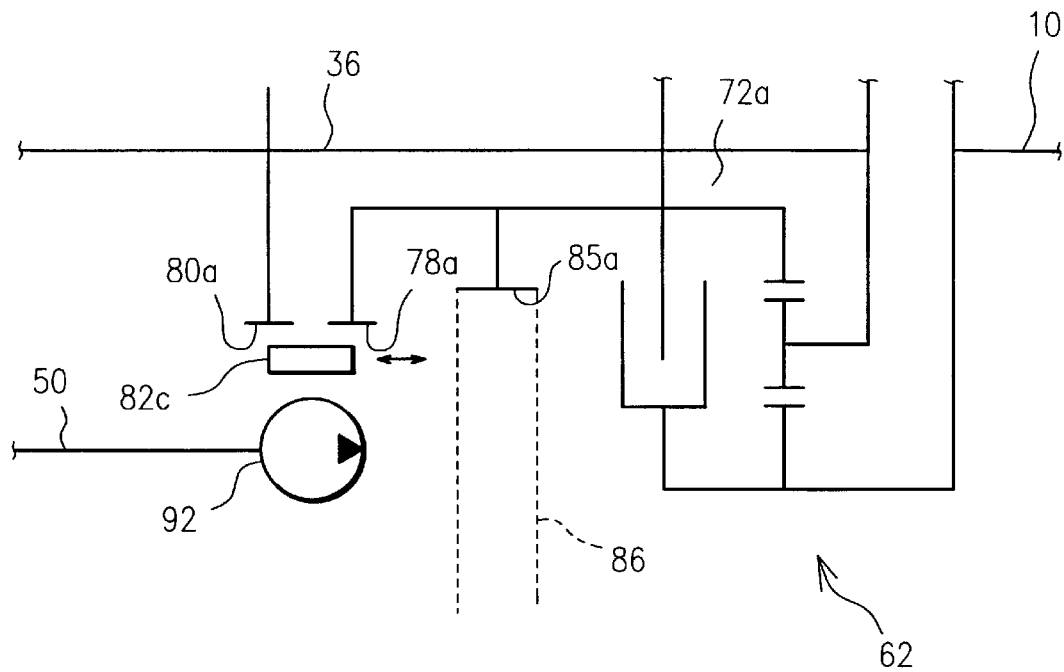
FIG. 19 is a schematic view showing a part of the transfer apparatus according to the sixth embodiment.

The transfer unit according to the sixth embodiment shown in FIG. 19 is a transfer unit added the direct-coupling 4WD driving mode to the transfer unit of the sixth embodiment. More specifically, the clutch gear 78*a* is mounted on the sleeve shaft 72*a* and the clutch gear 80*a* is mounted on the intermediate shaft 36. Then, the coupling sleeve 82*c* is disposed outside the clutch gear 78*a* and 80*a*. The coupling sleeve 82*c* is located near the hydraulic pump 92.

The transfer unit according to the sixth embodiment has the same function as the transfer unit of the fifth embodiment. When the clutch gears 78*a* and 80*a* are connected to each other by the coupling sleeve 82*a*, the driving mode of the transfer unit is changed to direct-coupling 4WD.

TRANSFER UNIT ACCORDING TO A SEVENTH EMBODIMENT

Figure 20:
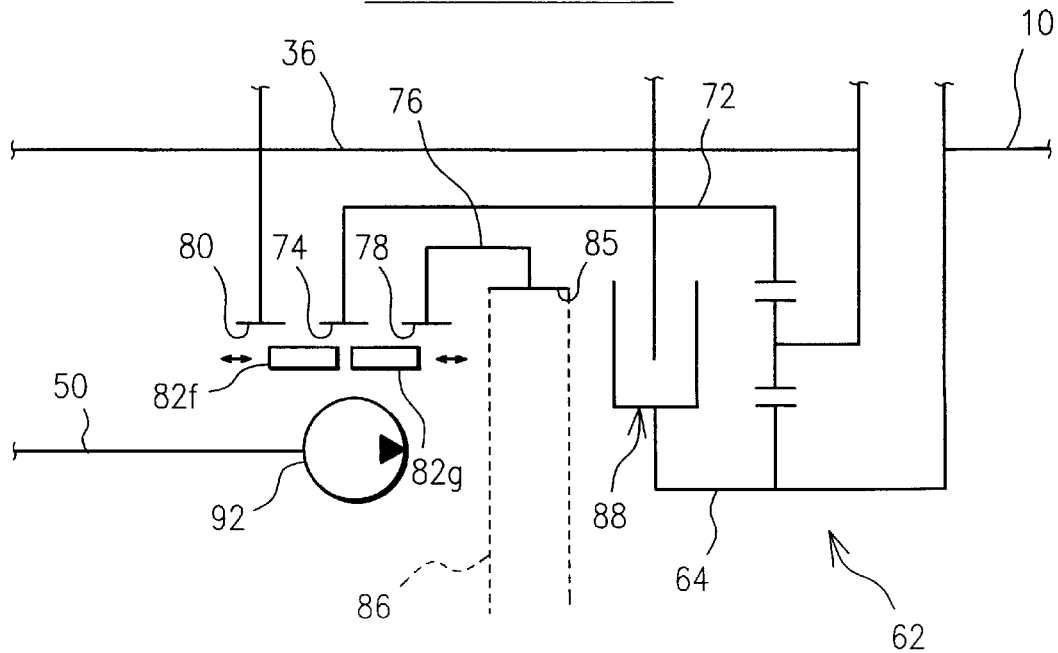
FIG. 20 is a schematic view showing a part of the transfer apparatus according to the seventh embodiment.
Figure 21:
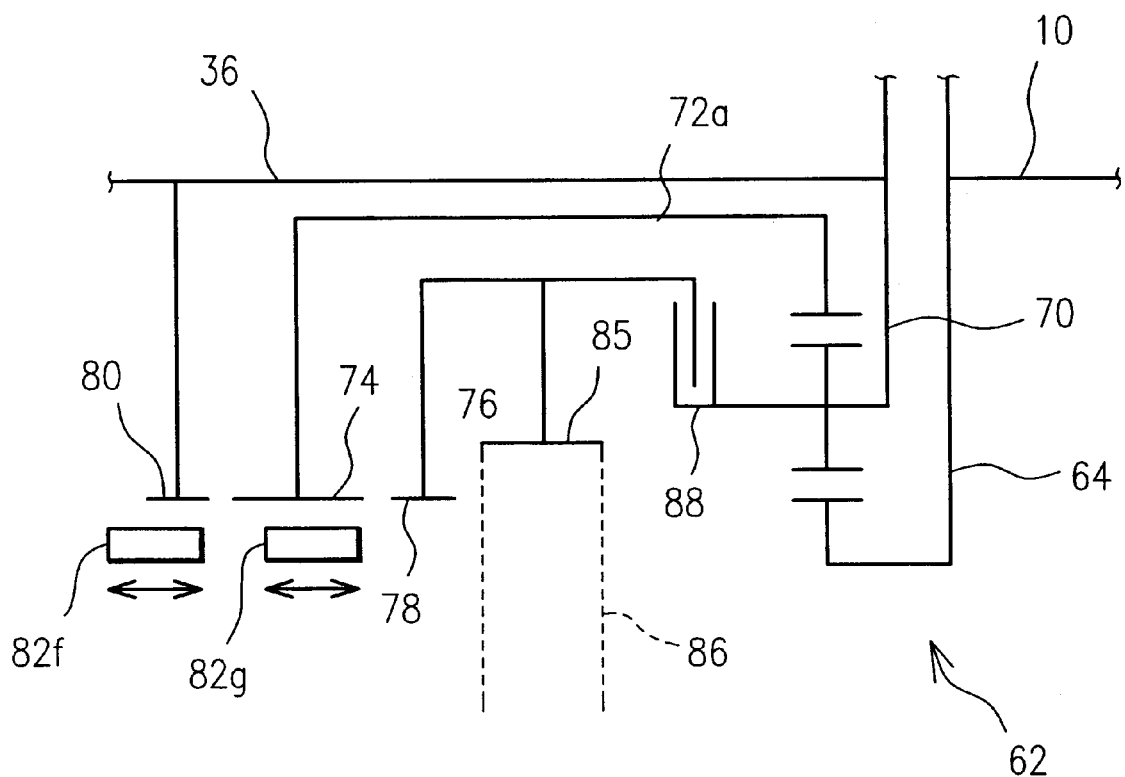
FIG. 21 is a schematic view showing a part of the transfer apparatus according to the eighth embodiment.

The transfer unit according to the seventh embodiment shown in FIG. 20 is different from the transfer unit 6 of the first embodiment in following two points.

First, the hydraulic multiple disc clutch 88 is disposed between the inner sleeve 72 and casing 64 of the center differential gear 62. Second, the coupling sleeve 82 is divided to a first coupling sleeve 82*f* and a second coupling sleeve 82*g*. The first and second coupling sleeves 82*f* and 82*g* are movable independently by corresponding shift actuators.

When the first coupling sleeve 82*f* connects the clutch gears 74 and 80 to each other while the second coupling sleeve 82*g* has released connection between the clutch gears 74 and 78, the drive power of the intermediate shaft 36 is transmitted to only the right and left rear wheels RW. In this case, the driving mode of the transfer unit according to the seventh embodiment is 2WD.

Conversely when the first coupling sleeve 82*f* has released connection between the clutch gears 74 and 80 while the second coupling sleeve 82*g* connects the clutch gears 74 and 78, the driving mode of the transfer unit is changed to full-time 4WD.

When the driving mode is full-time 4WD, by adjusting the clutch pressure of the hydraulic multiple disc clutch 88, the allocation of the drive power to the front wheels FW and rear wheels RW can be controlled.

When the first and second coupling sleeves 82*f* and 82*g* connect the clutch gears 74, 78 and 80 to each other, the driving mode of the transfer unit is changed to direct-coupling 4WD.

In the seventh embodiment, the first and second coupling sleeves 82*f* and 82*g* may be formed as a single coupling sleeve 82 like the first embodiment. In this case, the seventh embodiment and first embodiment are different from each other in terms of only the disposition of the hydraulic multiple disc clutch 88.

TRANSFER UNIT ACCORDING TO AN EIGHTH EMBODIMENT

As compared to the transfer unit according to the first embodiment, the transfer unit according to the eighth embodiment is different therefrom in the following points. In the eighth embodiment, the hydraulic multiple disc clutch 88 is disposed between the carrier 70 of the center differential gear 62 and outer sleeve shaft 76. Then, like the seventh embodiment, the coupling sleeve 82 is divided to first and second coupling sleeves 82*f* and 82*g*.

The transfer unit of the eighth embodiment has the same function and advantage as the transfer unit of the first embodiment.

When the first and second coupling sleeves 82*f* and 82*g* are disabled to move due to a trouble of the shift actuator 60, the ECU 94 connects the carrier 70 of the center differential gear 62 and outer sleeve shaft 76 to each other through the hydraulic multiple disc clutch 88, and stops the operation of the vacuum actuator 28. In this case, the drive power of the intermediate shaft 36 is directly transmitted from the carrier 70 of the center differential gear 62 to the outer sleeve shaft 76, so that this drive power rotates the right and left front wheels FW. Therefore, upon emergency, the driving mode of the transfer unit is changed to 4WD thereby making it possible to operate the vehicle so as to evade securely and stably.

OPERATION OF THE TRANSFER UNIT ACCORDING TO THE SEVENTH AND EIGHT EMBODIMENTS

2WD

Now, when the vehicle is traveling on 2WD mode, the first coupling sleeve 82*f* has connected the clutch gears 74 and 80 to each other and the second coupling sleeve 82g has released connection between the clutch gears 74 and 78. At this time, the vacuum actuator 28 is actuated and the coupling sleeve 24 has released connection between the clutch gears 20 and 22 on the right front axle.

Therefore, the center differential gear 62 is mechanically locked, so that the drive power of the intermediate shaft 36 is transmitted securely to the right and left rear wheels RW. At this time, as described above, the rotation of the front propeller shaft 16 is halted. As a result, consumption of fuel is reduced so that noise originating from the rotation of the front propeller shaft 16 is eliminated.

2WD→FULL-TIME 4WD

For example, when the vehicle is stopped, the ECU 94 adjusts the clutch pressure of the hydraulic multiple disc clutch 88 so as to synchronize the rotations of the clutch gears 74 and 78. With this condition, the ECU 94 drives the shift actuator so as to move the shift fork for the second coupling sleeve 82g, namely the second coupling sleeve 82g toward the side of the clutch gear 78. Therefore, the second coupling sleeve 82g connects the clutch gears 74 and 78. This connection of the clutch gears 74 and 78 rotates the front propeller shaft 16 in the halt condition. Thus, as described above, the front propeller shaft 16 rotates the casing of the front differential gear 18 so as to change the rotation direction of the clutch gear 20 of the right front axle to vehicle forwarding direction.

Next, the ECU 94 stops the operation of the vacuum actuator 28. Therefore, the coupling sleeve 24 is moved to the locking position so as to connect the clutch gears 20 and 22.

After that, the ECU 94 drives the shift actuator so as to move the shift fork for the first coupling sleeve 82f, namely the first coupling sleeve 82f to the side opposite to the clutch gear 78. Thus, the first coupling sleeve 82f releases connection between the clutch gears 74 and 80. At this time, the driving mode of the transfer unit is changed from 2WD to 4WD.

After that, when the vehicle is traveling on full-time 4WD mode, the ECU 94 adjusts the clutch pressure of the hydraulic multiple disc clutch 88 so as to distribute drive power optimum for the traveling condition of the vehicle to the front wheels FW and rear wheels RW.

As described above, after the rotations of the clutch gears 74, 78 are synchronized, the second coupling sleeve 82g is moved. Thus, change-over from 2WD to full-time 4WD is achieved smoothly.

It is possible to dispose a synchronizing device or synchronizing system between the clutch gears 74 and 78. In this case, even during traveling of the vehicle, change-over from 2WD to full-time 4WD can be carried out easily.

FULL-TIME 4WD—DIRECT-COUPLING 4WD

The ECU 94 adjusts the clutch pressure of the hydraulic multiple disc clutch 88 according to output signals from the rotation speed sensors 106, 108 so as to substantially synchronize the rotations of the clutch gears 74, 80. With this condition, the ECU 94 drives the shift actuator so as to move the first coupling sleeve 82f to the side of the clutch gear 78. Consequently, the first coupling sleeve 82f connects the clutch gears 74 and 80. At this time, the first and second coupling sleeves 82f, 82g connects the clutch gears 74, 78, 80 to each other, so that the driving mode of the transfer unit is changed from full-time 4WD to direct-coupling 4WD. After that, the ECU 94 released the clutch pressure of the hydraulic multiple disc clutch 88.

Upon change-over of the driving mode here, the rotations of the clutch gears 74 and 80 are synchronized with each other by the help of the hydraulic multiple disc clutch 88, so that the movement of the first coupling sleeve 82f is made smooth. Therefore, the change-over from full-time 4WD to direct-coupling 4WD can be carried out easily.

When the driving mode of the transfer unit is set to direct-coupling 4WD, the clutch gears 74 and 80 are mechanically connected to each other by the first coupling sleeve 82f. Therefore, the drive power can be distributed to the front wheels FW and rear wheels RW at the same ratio as loaded distribution thereof without operating the hydraulic multiple disc clutch 88. Therefore, energy is not consumed for operating the hydraulic multiple disc clutch 88, so that energy loss can be reduced.

DIRECT-COUPLING 4WD→FULL-TIME 4WD

The ECU 94 drives the shift actuator 60 so as to move the first coupling sleeve 82f inversely thereby releasing connection between the clutch gears 74 and 80. At this time, the driving mode of the transfer unit is changed over from direct-coupling 4WD to full-time 4WD. After that, the ECU 94 adjusts the clutch pressure of the hydraulic multiple disc clutch 88 so as to distribute the drive power to the front wheels FW and rear wheels RW optimally corresponding to the traveling condition of the vehicle.

In this case, before the first coupling sleeve 82f is moved, the hydraulic multiple disc clutch 88 may connect the inner sleeve shaft 72 to the casing 64 of the center differential gear 62 integrally.

FULL-TIME 4WD→2WD

First, the ECU 94 substantially synchronizes the rotations of the clutch gears 74 and 80 with each other by the help of the hydraulic multiple disc clutch 88. With this condition, the ECU 94 drives the shift actuator so as to move the first coupling sleeve 82f to the side of the clutch gear 80. Therefore, the first coupling sleeve 82f connects the clutch gears 74 and 80. After that, the ECU 94 releases the clutch pressure of the hydraulic multiple disc clutch 88 and actuates the vacuum actuator 28. Then, the coupling sleeve 24 is moved to the free position, thereby releasing connection between the clutch gears 20 and 22. After that, the ECU 94 drives the shift actuator so as to move the second coupling sleeve 82g to the side of the clutch gear 80, and then the second coupling sleeve 82g releases connection between the clutch gears 74 and 78. At this time, the driving mode of the transfer unit is changed from full-time 4WD to 2WD.

Upon change-over of the driving mode as well, since the hydraulic multiple disc clutch 88 substantially synchronizes the rotations of the clutch gears 74 and 80 with each other, the first coupling sleeve 82f can be moved smoothly, thereby facilitating the change-over from full-time 4WD to 2WD.

When the driving mode is set to 2WD, the clutch gears 74 and 80 are mechanically connected to each other by the first coupling sleeve 82f so that the center differential gear 62 becomes locking state without actuating the hydraulic multiple disc clutch 88. Therefore, energy is not consumed for actuating the hydraulic multiple disc clutch 88, so that energy loss can be reduced.

For example, when the shift actuator is in trouble so that the first coupling sleeve 82f cannot be moved, it is possible to set the center differential gear 62 in a substantially locking state by the help of the hydraulic multiple disc clutch 88. In this case, if the driving mode of the transfer unit is 2WD, the drive power can be transmitted securely to the rear wheels RW. Then, when the driving mode is set to full-time 4WD, the drive power is transmitted to the front wheels FW and rear wheels RW like in the case of direct-coupling 4WD.

FURTHER MODIFICATION OF THE TRANSFER UNIT

In the aforementioned fourth, sixth, seventh and eighth embodiments, the hydraulic pump 92 may be disposed in the dead space within the driving chain 86.

In the first-eighth embodiments, to transmit the drive power to the front propeller shaft 16, it is permissible to use a gear train instead of the sprocket and driving chain. In this case, the hydraulic pump 92 is disposed without an interference with the gear train.

In the seventh embodiment, it is permissible to dispose the hydraulic multiple disc clutch 88 between the casing 64 of the center differential gear 62 and carrier 70.

In the seventh and eighth embodiments, the first and second coupling sleeves 82f and 82g may be formed as a single coupling sleeve like the first embodiment.

In the seventh and eighth embodiments, the first coupling sleeve 82f is used to make/release connection between the intermediate shaft 36 and inner sleeve shaft 72. However, the first coupling sleeve 82f may be so constructed to make/release connection between the intermediate shaft 36 and casing 64 of the center differential gear 62 or between the inner sleeve shaft 72 and casing 64.

The gear ratio of the aforementioned center differential gear is set so as to differentiate the drive powers applied to the front wheels FW and rear wheels RW. However, instead of the center differential gear 62, it is permissible to use, for example, a bevel gear type differential gear for distributing the drive power to the front wheels FW and rear wheels equally. In this case, during a traveling on full-time 4WD mode, it is impossible to control the allocation of the drive power to the front wheels FW and rear wheels RW. However, when the full-time 4WD is selected, by adjusting the clutch pressure of the hydraulic multiple disc clutch 88, the differential motion of the front wheels FW and rear wheels RW can be restricted. In such a transfer unit as well, when the driving mode is changed over, the synchronizing effect by the hydraulic multiple disc clutch can be obtained so that the driving mode can be changed easily.

Further, the structures of the aforementioned first-eighth embodiments can be combined with each other arbitrarily.

We claim:

1. A power transmission apparatus comprising:

an input shaft rotated by receiving a drive power from an engine;

an intermediate shaft disposed independently of said input shaft;

auxiliary transmission means for transmitting the rotation of said input shaft to said intermediate shaft at a selectable gear ratio, said auxiliary transmission means including a counter shaft disposed in parallel to said input shaft;

2WD–4WD change-over means for selectively transmitting the rotation of said intermediate shaft to both the front and rear wheels or one of the front and rear wheels, said 2WD–4WD change-over means including a center differential gear;

differential limiting means for limiting a differential motion of said center differential gear by use of liquid pressure;

supply means for supplying the liquid pressure to said differential limiting means, said supply means including a liquid pressure pump connected coaxially to said counter shaft and driven by said counter shaft; and a shift actuator for making said auxiliary transmission means and said 2WD–4WD change-over means to carry out a change operation of the gear ratio and change-over respectively, said shift actuator including:

a first change-over member for making said auxiliary transmission means to carry out the change operation;

a second change-over member for making said 2WD–4WD change-over member to carry out a change-over, said second change-over member being disposed coaxially with said first change-over member; and a driving member for moving said first and second change-over members.

2. The power transmission apparatus according to claim 1 wherein:

said auxiliary transmission means includes a transmission sleeve for achieving the speed change of said auxiliary transmission means by moving in an axial direction of said input shaft, and a transmission shift fork for connecting said transmission sleeve to said first change-over member;

said 2WD–4WD change-over means includes a change-over sleeve for achieving the change-over of said 2WD–4WD change-over means by moving in the axial direction of said input shaft, said change-over sleeve being disposed coaxially with said transmission sleeve, and a change-over shift fork for connecting said change-over sleeve to said second change-over member; and said shift actuator includes:

first and second racks disposed on said first and second change-over members;

a third rack disposed on said driving member;

a transmission pinion for meshing with said first rack and third rack;

a change-over pinion for meshing with said second rack and third rack; and an electric motor for driving said driving member.

3. The power transfer apparatus according to claim 2 wherein said shift actuator includes:

teeth omitting portions formed on said transmission pinion and said change-over pinion, respectively, each of the teeth omitting portions lacking teeth;

a first stopper disposed on said driving member, said first stopper blocking the rotation of said transmission pinion regardless of a movement of said driving member when said transmission pinion does not mesh with said third rack; and a second stopper disposed on said driving member, said second stopper blocking the rotation of said change-over pinion regardless of a movement of said driving member when said change-over pinion does not mesh with said third rack.

4. The power transfer apparatus according to claim 1 wherein said liquid pressure pump is disposed at a position corresponding to said second change-over member with respect to the axial direction of said input shaft.

5. The power transfer apparatus according to claim 1 wherein said 2WD–4WD change-over means further includes an endless driving chain for transmitting the rotation to either the front wheel or the rear wheel, and said liquid pressure pump is disposed in a space within said driving chain.

* * * * *